US011426762B2

(12) United States Patent
Du et al.

(10) Patent No.: US 11,426,762 B2
(45) Date of Patent: Aug. 30, 2022

(54) LOW BAKE AUTODEPOSITION COATINGS

(71) Applicant: Henkel AG & Co. KGaA, Duesseldorf (DE)

(72) Inventors: Libin Du, Troy, MI (US); Bashir M. Ahmed, Rochester, MI (US); Umesh D. Harkal, Nashik (IN); Omar Lutfi Abu-Shanab, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 463 days.

(21) Appl. No.: 16/021,954

(22) Filed: Jun. 28, 2018

(65) Prior Publication Data
US 2018/0304306 A1  Oct. 25, 2018

Related U.S. Application Data

(63) Continuation of application No. PCT/US2016/068791, filed on Dec. 28, 2016.

(60) Provisional application No. 62/273,603, filed on Dec. 31, 2015.

(51) Int. Cl.
| | |
|---|---|
| B05D 7/14 | (2006.01) |
| C09D 163/00 | (2006.01) |
| B05D 3/02 | (2006.01) |
| C09D 5/08 | (2006.01) |
| C09D 133/08 | (2006.01) |
| C09D 7/40 | (2018.01) |
| C09D 4/06 | (2006.01) |
| C08F 283/10 | (2006.01) |
| C08K 5/00 | (2006.01) |
| C09D 5/02 | (2006.01) |
| C09D 175/04 | (2006.01) |

(52) U.S. Cl.
CPC ........... *B05D 7/142* (2013.01); *B05D 3/0254* (2013.01); *C08F 283/10* (2013.01); *C08K 5/0025* (2013.01); *C09D 4/06* (2013.01); *C09D 5/027* (2013.01); *C09D 5/08* (2013.01); *C09D 7/40* (2018.01); *C09D 133/08* (2013.01); *C09D 163/00* (2013.01); *C09D 175/04* (2013.01)

(58) Field of Classification Search
CPC ...................................................... B05D 7/14
See application file for complete search history.

(56) References Cited

U.S. PATENT DOCUMENTS

| | | | |
|---|---|---|---|
| 3,063,877 A | 11/1962 | Schiffman | |
| 3,585,084 A | 6/1971 | Steinbrecher et al. | |
| 3,592,699 A | 7/1971 | Steinbrecher et al. | |
| 3,674,567 A | 7/1972 | Bradley et al. | |
| 3,791,431 A | 2/1974 | Steinbrecher et al. | |
| 3,795,546 A | 3/1974 | Hall et al. | |
| 4,030,945 A | 6/1977 | Hall et al. | |
| 4,108,817 A | 8/1978 | Lochel, Jr. | |
| 4,111,828 A * | 9/1978 | Wang | C08G 18/4883 252/182.26 |
| 4,177,302 A | 12/1979 | Weiss | |
| 4,178,400 A | 12/1979 | Lochel, Jr. | |
| 4,180,603 A | 12/1979 | Howell, Jr. | |
| 4,186,226 A | 1/1980 | Smith | |
| 4,234,704 A | 11/1980 | Sakanaka et al. | |
| 4,242,379 A | 12/1980 | Hall et al. | |
| 4,263,162 A | 4/1981 | Buysch et al. | |
| 4,289,826 A | 9/1981 | Howell, Jr. | |
| 4,419,467 A | 12/1983 | Wismer et al. | |
| 4,430,462 A | 2/1984 | Jaeger et al. | |
| 4,437,960 A | 3/1984 | Zengel et al. | |
| 4,452,681 A | 6/1984 | Moriarity | |
| 4,486,553 A | 12/1984 | Wesch | |
| 4,575,523 A | 3/1986 | Anderson et al. | |
| 4,636,264 A | 1/1987 | Schellenberg et al. | |
| 4,636,265 A | 1/1987 | Fischer et al. | |
| 4,742,097 A | 5/1988 | Turpin et al. | |
| 4,748,200 A | 5/1988 | Nasu | |
| 4,789,690 A * | 12/1988 | Milovanovic-Lerik | C08L 63/00 521/137 |
| 4,789,721 A | 12/1988 | Waddill et al. | |

(Continued)

FOREIGN PATENT DOCUMENTS

| | | |
|---|---|---|
| AT | 405289 B | 6/1999 |
| CA | 977219 A | 11/1975 |

(Continued)

OTHER PUBLICATIONS

International Search Report for PCT/US2016/068791, dated Apr. 20, 2017.
"Epoxy Resins", The Encyclopedia of Polymer Science and Engineering (Second Edition), vol. 6, pp. 322-382. Publisher: John Wiley & Sons—Cited in specification.
Wicks, Douglas A., et al "Progress in Organic Coatings", Review Paper "Blocked isocyanates III: Part A. Mechanisms and chemistry", vol. 36 (1999) pp. 148-172. Publisher: Elsevier Science B.V.—Cited in specification.
Wicks, Douglas A., et al, "Progress in Organic Coatings", "Blocked isocyanates III, Part B: Uses and applications of blocked isocyanates", vol. 41 (2001) pp. 1-83. Publisher: Elsevier Science B.V.

(Continued)

*Primary Examiner* — David P Turocy
(74) *Attorney, Agent, or Firm* — Mary K. Cameron

(57) ABSTRACT

Autodeposition coating compositions that deposit uncured coatings, on metallic surfaces of a substrate, which are curable at oven temperatures of less than 130° C., are provided as well as autodeposition methods, compositions and components for depositing such autodeposition coatings. More particularly, the invention relates to autodeposition coatings that cure at temperatures lower than conventional autodeposition coatings, while achieving chemical and corrosion performance comparable to higher temperature cure autodeposition coatings, as well as being directed to autodeposition coating compositions possessing improved storage stability and coating thermal stability, and articles of manufacture having cured and uncured autodeposited coatings deposited thereon.

12 Claims, No Drawings

(56) References Cited

U.S. PATENT DOCUMENTS

| | | |
|---|---|---|
| 4,800,106 A | 1/1989 | Broadbent |
| 4,845,136 A | 7/1989 | Saito et al. |
| 4,872,961 A | 10/1989 | McIntyre et al. |
| 4,914,164 A | 4/1990 | Gannon et al. |
| 4,981,759 A | 1/1991 | Nakatani et al. |
| 5,039,385 A | 8/1991 | Tominaga |
| 5,066,688 A | 11/1991 | Chung et al. |
| 5,075,165 A | 12/1991 | Kishi et al. |
| 5,185,065 A | 2/1993 | Chung et al. |
| 5,281,316 A | 1/1994 | Chung et al. |
| 5,342,694 A | 8/1994 | Ahmed et al. |
| 5,356,961 A | 10/1994 | Nishimura et al. |
| 5,384,386 A | 1/1995 | Huemke et al. |
| 5,405,701 A | 4/1995 | Fujibayashi et al. |
| 5,468,791 A | 11/1995 | Yuan |
| 5,500,460 A | 3/1996 | Ahmed et al. |
| 5,506,284 A | 4/1996 | McGee |
| 5,510,400 A | 4/1996 | Kageyama et al. |
| 5,523,363 A | 6/1996 | Fujibayashi et al. |
| 5,556,913 A | 9/1996 | Tobinaga et al. |
| 5,569,704 A | 10/1996 | Yamada et al. |
| 5,618,905 A | 4/1997 | Marsella et al. |
| 5,674,925 A | 10/1997 | Yamada et al. |
| 5,688,905 A | 11/1997 | Walker |
| 5,707,702 A | 1/1998 | Brady, Jr. et al. |
| 5,744,521 A | 4/1998 | Takasaki et al. |
| 5,756,221 A | 5/1998 | Horibe et al. |
| 5,767,191 A | 6/1998 | Zawacky et al. |
| 5,770,642 A | 6/1998 | Kanato et al. |
| 5,820,987 A | 10/1998 | Kaufman et al. |
| 6,048,443 A | 4/2000 | December et al. |
| 6,063,890 A | 5/2000 | Tye |
| 6,083,564 A | 7/2000 | Igarashi et al. |
| 6,096,806 A * | 8/2000 | Mueller ............... C08J 3/03 523/402 |
| 6,130,274 A | 10/2000 | Song et al. |
| 6,190,524 B1 | 2/2001 | Kollah et al. |
| 6,207,731 B1 | 3/2001 | Gam |
| 6,258,920 B1 | 7/2001 | Starner et al. |
| 6,277,928 B1 | 8/2001 | Stark et al. |
| 6,303,707 B1 | 10/2001 | Nishiguchi et al. |
| 6,425,947 B1 | 7/2002 | Berlin et al. |
| 6,464,813 B1 | 10/2002 | McQuaid et al. |
| 6,475,366 B1 | 11/2002 | Nishiguchi et al. |
| 6,476,102 B1 | 11/2002 | Chung et al. |
| 6,517,695 B1 | 2/2003 | Garner et al. |
| 6,582,575 B2 | 6/2003 | Miyatake et al. |
| 6,613,387 B2 | 9/2003 | Agarwal et al. |
| 6,713,588 B2 | 3/2004 | Fushihara |
| 6,730,203 B2 | 5/2004 | Ikenoue et al. |
| 6,736,925 B2 | 5/2004 | Autterson et al. |
| 6,736,950 B1 | 5/2004 | Klein et al. |
| 6,743,837 B2 | 6/2004 | Chung et al. |
| 6,881,813 B2 | 4/2005 | Hoefer et al. |
| 6,887,526 B1 | 5/2005 | Arlt et al. |
| 7,078,474 B2 | 7/2006 | Hermann et al. |
| 7,211,182 B2 | 5/2007 | Lehmann et al. |
| 7,388,044 B2 | 6/2008 | McGee et al. |
| 7,781,499 B2 | 8/2010 | Bigorra Llosas et al. |
| 8,003,737 B2 | 8/2011 | Muller-Frischinger |
| 8,026,320 B2 | 9/2011 | Nishiguchi et al. |
| 8,097,664 B2 | 1/2012 | Nishiguchi et al. |
| 8,097,665 B2 | 1/2012 | Nishiguchi et al. |
| 8,293,863 B2 | 10/2012 | Vedage et al. |
| 8,426,500 B2 | 4/2013 | Baumgart et al. |
| 8,563,796 B2 | 10/2013 | Dhersin |
| 2002/0102356 A1* | 8/2002 | Agarwal ............... B05D 7/144 427/343 |
| 2003/0068498 A1* | 4/2003 | Weller ............... C09D 163/00 428/416 |
| 2003/0152790 A1* | 8/2003 | Halladay ............ C09D 115/005 428/500 |
| 2004/0048954 A1 | 3/2004 | Thieben |
| 2004/0147999 A1 | 7/2004 | Udipi et al. |
| 2004/0210047 A1 | 10/2004 | Sachinvala et al. |
| 2004/0249044 A1 | 12/2004 | Nguyenquang et al. |
| 2005/0119373 A1 | 6/2005 | Taylor et al. |
| 2005/0161330 A1 | 7/2005 | Toi et al. |
| 2005/0279254 A1 | 12/2005 | Toi et al. |
| 2005/0282936 A1 | 12/2005 | Toi et al. |
| 2007/0073005 A1 | 3/2007 | Iijima et al. |
| 2007/0089996 A1 | 4/2007 | Kojima |
| 2008/0227911 A1 | 9/2008 | Hermann et al. |
| 2008/0269428 A1 | 10/2008 | Volle et al. |
| 2009/0274844 A1 | 11/2009 | Scheibel et al. |
| 2010/0167088 A1 | 7/2010 | Chouai et al. |
| 2010/0189905 A1 | 7/2010 | Nakahara et al. |
| 2010/0270162 A1 | 10/2010 | Nishiguchi et al. |
| 2011/0027591 A1 | 2/2011 | Braun et al. |
| 2011/0094890 A1 | 4/2011 | Grosse Brinkhaus et al. |
| 2012/0027938 A1 | 2/2012 | Kitamura et al. |
| 2012/0282404 A1* | 11/2012 | Rosenkranz ............ C23C 22/78 427/337 |
| 2014/0042031 A1 | 2/2014 | Okada et al. |
| 2014/0045972 A1 | 2/2014 | Du et al. |
| 2014/0072815 A1* | 3/2014 | Moravek ............... C09D 4/00 428/447 |
| 2014/0151230 A1 | 6/2014 | Aiba et al. |
| 2016/0244882 A1* | 8/2016 | Sinnwell ............ C09D 183/04 |

FOREIGN PATENT DOCUMENTS

| | | |
|---|---|---|
| CA | 2395072 A1 | 6/2001 |
| CA | 2461067 A1 | 9/2005 |
| CN | 1387475 A | 12/2002 |
| CN | 1483772 A | 3/2004 |
| CN | 101157754 A | 4/2008 |
| CN | 101402822 A | 4/2009 |
| CN | 101519544 A | 9/2009 |
| CN | 101939115 A | 1/2011 |
| CN | 102010572 A | 4/2011 |
| CN | 102153729 A | 8/2011 |
| CN | 102574157 A | 7/2012 |
| CN | 102618148 A | 8/2012 |
| CN | 102744186 A | 10/2012 |
| CN | 103031036 A | 4/2013 |
| CN | 103113806 A | 5/2013 |
| CN | 103173087 A | 6/2013 |
| CN | 103333595 A | 10/2013 |
| CN | 103497617 A | 1/2014 |
| CS | 263800 B1 | 4/1989 |
| CS | 277310 B6 | 1/1993 |
| DE | 1446733 A | 6/1969 |
| DE | 2242542 A1 | 3/1973 |
| DE | 129663 A | 2/1978 |
| DE | 2840075 A1 | 3/1979 |
| DE | 3712733 A | 11/1988 |
| DE | 4103153 C1 | 3/1992 |
| DE | 4139126 A | 6/1993 |
| EP | 41200 A1 | 12/1981 |
| EP | 240460 A2 | 10/1987 |
| EP | 339507 A2 | 11/1989 |
| EP | 1000957 A1 | 5/2000 |
| EP | 1852479 A1 | 11/2007 |
| EP | 1876382 A1 | 1/2008 |
| EP | 2198982 A2 | 6/2010 |
| EP | 2239293 A1 | 10/2010 |
| GB | 988484 A | 4/1964 |
| GB | 2368338 A | 5/2002 |
| IN | 215612 B | 3/2008 |
| JP | S62129362 A | 6/1967 |
| JP | 50061430 A | 5/1975 |
| JP | 50061434 A | 5/1975 |
| JP | 53098357 A | 8/1978 |
| JP | 55040755 A | 3/1980 |
| JP | 58083573 A | 5/1983 |
| JP | S60229967 A | 11/1985 |
| JP | 61235476 A | 10/1986 |
| JP | S62129363 A | 6/1987 |
| JP | 62156298 A | 7/1987 |
| JP | 63020373 A | 1/1988 |
| JP | 63317695 A | 12/1988 |
| JP | 01116100 A | 5/1989 |
| JP | 01182377 A | 7/1989 |

(56) References Cited

FOREIGN PATENT DOCUMENTS

| | | |
|---|---|---|
| JP | 01266172 A | 10/1989 |
| JP | 02011669 A | 1/1990 |
| JP | 03081374 A | 4/1991 |
| JP | H0418459 A | 1/1992 |
| JP | 04033969 A | 2/1992 |
| JP | 04091170 A | 3/1992 |
| JP | H04110065 A | 4/1992 |
| JP | 05032919 A | 2/1993 |
| JP | 05311094 A | 11/1993 |
| JP | H05311099 A | 11/1993 |
| JP | 05331691 A | 12/1993 |
| JP | 06017293 A | 1/1994 |
| JP | 06100806 A | 4/1994 |
| JP | H6100805 A | 4/1994 |
| JP | H07292314 A | 11/1995 |
| JP | 08120494 A | 5/1996 |
| JP | H08120222 A | 5/1996 |
| JP | 08157755 A | 6/1996 |
| JP | 08301985 A | 11/1996 |
| JP | H09194769 A | 7/1997 |
| JP | 10292132 A | 11/1998 |
| JP | 11140353 A | 5/1999 |
| JP | 11207252 A | 8/1999 |
| JP | 11290778 A | 10/1999 |
| JP | 2000007958 A | 1/2000 |
| JP | 2000345394 A | 12/2000 |
| JP | 2001002985 A | 1/2001 |
| JP | 2001172557 A | 6/2001 |
| JP | 2001233934 A | 8/2001 |
| JP | 2002053997 A | 2/2002 |
| JP | 2002080564 A | 3/2002 |
| JP | 2002126617 A | 5/2002 |
| JP | 2002129099 A | 5/2002 |
| JP | 2002129100 A | 5/2002 |
| JP | 2002129368 A | 5/2002 |
| JP | 2002188048 A | 7/2002 |
| JP | 2002285079 A | 10/2002 |
| JP | 2002294146 A | 10/2002 |
| JP | 2002363256 A | 12/2002 |
| JP | 2003033719 A | 2/2003 |
| JP | 2003171611 A | 6/2003 |
| JP | 2004027255 A | 1/2004 |
| JP | 2004123942 A | 4/2004 |
| JP | 2004141795 A | 5/2004 |
| JP | 2004225095 A | 8/2004 |
| JP | 2004256802 A | 9/2004 |
| JP | 2004307800 A | 11/2004 |
| JP | 2004322029 A | 11/2004 |
| JP | 2005170958 A | 6/2005 |
| JP | 2006026497 A | 2/2006 |
| JP | 2006075209 A | 3/2006 |
| JP | 2006088089 A | 4/2006 |
| JP | 2007031530 A | 2/2007 |
| JP | 2007038688 A | 2/2007 |
| JP | 2007099832 A | 4/2007 |
| JP | 2007143386 A | 6/2007 |
| JP | 2007246806 A | 9/2007 |
| JP | 2007284600 A | 11/2007 |
| JP | 2008144070 A | 6/2008 |
| JP | 2008169960 A | 8/2008 |
| JP | 2008184552 A | 8/2008 |
| JP | 2008231142 A | 10/2008 |
| JP | 2009035759 A | 2/2009 |
| JP | 2009091594 A | 4/2009 |
| JP | 2009138126 A | 6/2009 |
| JP | 2009235350 A | 10/2009 |
| JP | 2009235351 A | 10/2009 |
| JP | 2010012407 A | 1/2010 |
| JP | 2010024288 A | 2/2010 |
| JP | 2010261011 A | 11/2010 |
| JP | 2011021261 A | 2/2011 |
| JP | 2011068703 A | 4/2011 |
| JP | 2011110116 A | 6/2011 |
| JP | 2011208034 A | 10/2011 |
| JP | 2012005997 A | 1/2012 |
| JP | 2012057034 A | 3/2012 |
| JP | 2013203966 A | 10/2013 |
| JP | 2013253131 A | 12/2013 |
| JP | 2014152247 A | 8/2014 |
| KR | 20030059845 A | 7/2003 |
| KR | 100896468 B1 | 5/2009 |
| KR | 2009072456 A | 7/2009 |
| NL | 8401273 A | 11/1984 |
| PL | 128363 B1 | 1/1984 |
| RO | 71971 A2 | 4/1983 |
| RO | 121642 B1 | 1/2008 |
| RU | 2028350 C1 | 2/1995 |
| RU | 2044019 C1 | 9/1995 |
| RU | 2049800 C1 | 12/1995 |
| RU | 2067105 C1 | 9/1996 |
| RU | 2076888 C1 | 4/1997 |
| RU | 2233299 C2 | 7/2004 |
| RU | 2252236 C1 | 5/2005 |
| RU | 2261879 C1 | 10/2005 |
| RU | 2272052 C1 | 3/2006 |
| RU | 2283333 C2 | 9/2006 |
| SU | 580667 A1 | 11/1977 |
| SU | 644665 A | 1/1979 |
| SU | 735616 A1 | 6/1980 |
| SU | 753875 B | 8/1980 |
| SU | 927832 A1 | 5/1982 |
| SU | 1326593 A1 | 7/1987 |
| SU | 1479479 A1 | 5/1989 |
| SU | 1767473 A1 | 10/1992 |
| SU | 1838351 A3 | 8/1993 |
| WO | 9008846 A1 | 6/1990 |
| WO | 9311284 A1 | 6/1993 |
| WO | 9937714 A1 | 7/1999 |
| WO | 0071337 A1 | 11/2000 |
| WO | 2002042008 A1 | 5/2002 |
| WO | 2004007443 A2 | 1/2004 |
| WO | 2005123622 A1 | 12/2005 |
| WO | 2007009581 A1 | 1/2007 |
| WO | 2008036259 A1 | 3/2008 |
| WO | 2009088993 A2 | 7/2009 |
| WO | 2012087813 A2 | 6/2012 |
| WO | 2012174424 A2 | 12/2012 |
| WO | 2013134752 A1 | 9/2013 |
| WO | 2013172880 A1 | 11/2013 |
| WO | 2014054549 A1 | 4/2014 |

OTHER PUBLICATIONS

Li, Jie, et al, "Preparation and properties of low temperature curable cathodic electrodeposition coatings", Source: Beijing Huangong Daxue Xuebao, Ziran Kexueban (2009), 36 (5), 56-60, Publisher: Beijing Huangon Daxue Xuebao, Ziran Kexueban Bianjibu, Accession No. 2009:1307301 CAPLUS—English abstract only.

He, Xu, et al, "Synthesis of macromolecular crossliner for epoxy cathodic electrophoretic paint curable at low temperature", Source: Tuliao, Gongye (2011), vol. 41 (12), 5-6, 21, Publisher: Tuliao Gongye Bianjibu, Acession No. 2012:1076880—English abstract only.

Zhang, Hongfeng, et al, "Preparation of epoxy cathodic electrophoretic coating curable at low temperature", Source: Diandu Yu Tushii (2012), 31(2), 53-56, Publisher: Diandu Yu Tushi Bianjibi, Accession No. 2012:549273 CAPLUS—English abstract only.

Kumar, Pramod, et al, "Development of low-temperature self-curable water soluble polyepoxide coatings for cathodic electrodeposition", Source: Paintindia (2002), 52(6), 45-46, 48-50, 52, 54, 56-58, 60, 62, 64, 66, Publisher: Colour Publications Pvt. Ltd., Accession No. 2002:611501 CAPLUS—English abstract only.

Kumar, P., et al, "Cathodic electro-deposition of low-temperature curable water-soluble polyepoxide coatings", Source: Progress in Organic Coatings (2000), 40(1-4), 63-74, Publisher: Elsevier Science S.A., Accession No. 2000:870756—CAPLUS English abstract only.

Wang, Wen-qing, "Progress in low-temperature curable cathodic electrophoretic coatings", Source: Wuhan Gongye Xueyuan Xuebao (2007), 26(4), 58-60, Publisher: Wuhan Gongye Xueyuan Xuebao Bianjibu, Accession No. 2006:259322—CAPLUS English abstract only.

(56) References Cited

OTHER PUBLICATIONS

Pi, Pihui, et al, "A kind of black epoxy-polyurethane cathodic electrophoretic coating", Source: Diandu Yu Tushi (2006), 25(10), 26-29, Publisher: Diandu Yu Tushi Bianjibu, Accession No. 2007:586976 CAPLUS—English abstract only.

Wang, Haiqiao, et al, "Application of diacetone acrylamide (DAAM) and adipic dihydrazide (ADH) crosslinking system in cathodic electrodeposition coating", Source: Huangon Xinxing Cailiao (2011), 39(12), 130-133, Publisher: Zhongguo Huangon Xinxi Zhongxin, Accession No. 2012:314797 CAPLUS—English abstract only.

Hu, Feiyan, et al, "Development of ricinoieic acid modified epoxy-polyurethane cathodic electrophoretic coating", Source: Tuliao Gongye (2009), 39(5), 53-56, 59, Publisher: Tuliao Gongye Bianjibu, Accession No. 2009:847634 CAPLUS—English abstract only.

Sato, Fumihiro, et al, "Effect of curing temperature on corrosion resistance of aluminum sheet coated with epoxy resin by electrodeposition", Source: Zairyo to Kankyo (1994), 43(12), 714-19, Publisher: Japan Society of Corrosion Engineering, Accession No. 1995:339255—English abstract only.

Ling, Xiaofei, et al, "Preparation and properties of heat-yellowing resistant cathodic electophoretic coating", Source: Tuliao Gongye (2012), 42(11), 39-42, Publisher: Tuliao Gongye Bianjibu, Accession No. 2013:1193447 CAPLUS—English abstract only.

Collong, Wilfried, et al, "Viscosity-temperature behavior of electrodeposition paints", Source: Applied Rheology (1996), 6(1), 27-31, Publisher: Vinceritz, Accession No. 1996:367502 CAPLUS—English abstract only.

Kim, Yang-Bae, et al, "Epoxy-acrylic microgels in electrodeposition coating films", Source: Surface and Coatings Technology (2002), 153(2-3), 284-289, Publisher: Elsevier Science B.V., Accession No. 2002:180672 CAPLUS—English abstract only.

Supplementary European Search Report for EP 16882531, dated May 31, 2019.

Alam, Mohammad Asif, et al, "Fabrication of various epoxy coating for offshore applications and evaluating their mechanical properties and corrosion behavior", Source: International Journal of Electrochemical Science (2013), 8(3), 3121-3131, Publisher: Electrochemical Science Group, Accession No. 2013:421353 CAPLUS—English abstract only.

Abbasi, Ehsan, et al, "Synthesis, structure, and mechanical properties of castor oil-based polyamidoamines toughened epoxy coatings", Source: Journal of Applied Polymer Science (2013), 128(6), 4023-4030, Publisher: John Wiley & Sons, Inc., Accession No. 2012:1526267 CAPLUS—English abstract only.

Shel, N. V., et al, "Impedance spectroscopy study of the anticorrosive effect of zinc-filled compositions based on rape oil", Source: Korroziya: Materialy, Zashchita (2012), (2), 22-27, Publisher: 000 "Nauka i Tekhnologii", Accession No. 2012:1290826 CAPLUS—English abstract only.

Dolgov, Mikola A., et al, "Study of mechanical properties of functionally gradient epoxy coatings under the influence of an aqueous medium", Source: Naftova i Gazova Promislovist (2011), (1), 42-46, Publisher: NAK "Naftogaz Ukraini", Accession No. 2011:1433188 CAPLUS—English abstract only.

Zagidullin, R. N., et al, "Compositions for anticorrosive coatings for chemical and petrochemical equipment and pipelines", Source: Khimicheskaya Tekhnika (2011), (7), 22-24, Publisher: Izdatel'stvo "Kompressornaya I Khimicheskaya Tekhnika", Accession No. 2011:1234247 CAPLUS—English abstract only.

Erofeev, V. T., et al, "Effect of plasticizers on the color of paints exposed to aggressive media", Source: Lakokrasochnye Materialy i lkh Primenenie (2011), (6), 38-41, Publisher: 000 "Peint-Media", Accession No. 2011:1015978 CAPLUS—English abstract only.

Ziganshina, M. P., et al, "Coatings based on epoxy composition with manganese-containing pigments", Source: Korroziya: Materialy, Zashchite (2011), (4), 44-48, Publisher: 000 "Nauka i Tekhnologii", Accession No. 2011:791634 CAPLUS—English abstract only.

Zhang, Kaixiang, et al, "Influence of aliphatic amine curing agent on the properties of the waterborne epoxy fire-retardant coatings for steel structure", Source: Xiandai Tuliao Yu Tuzhuang (2010), 13(11), 7-11, Publisher: Xiandai Tuliao Yu Tuzhuang Bianjibu, Accession No. 2010:1635375 CAPLUS—English abstract only.

Dobrotvor, I. G., "Characteristics of cluster structure of epoxy coatings", Source: Naftova i Gazova Promislovist (2010), (1), 36-39, Publisher: NAK "Naftogaz Ukraini", Accession No. 2010:977594 CAPLUS—English abstract only.

Geisler, Joerg-Peter, "Formulation of low-emission epoxy hardener without benzyl alcohol", Source: Farbe + Lack (2010), 116(3), 16-18,20, Publisher: Vincentz Natwork, Accession No. 2010:352276 CAPLUS—English abstract only.

Maslennikova, L. D., et al, "Polymers modified with glycol Aerosits. Lyophilic-lyophobic interactions in surface layers", Source: Khimichna Promislovist Ukraini (Kiev, Ukraine) (2009), (4), 36-38, Publisher: AT "VNKIKhlMPROEKT", Accession No. 2009:1203154 CAPLUS—English abstract only.

Kvasnikov, M. Yu., et al, "Fluorinated paint-and-varnish compounds and coatings prepared from them", Source: Russian Journal of Applied Chemistry (2009), 82(3), 500-504, Publisher: Pleiades Publishing, Ltd., Accession No. 2009:533768 CAPLUS—English abstract only.

Garipov, R. M., et al, "Effect of silane-modified amine hardener on the properties of epoxy resin coatings", Source: Lakokrasochnye Materialy i lkh Primenenie (2007), (7-8), 33-36, Publisher: 000 "Peint-Media", Accession No. 2007:1129025 CAPLUS—English abstract only.

Kravtsov, V. V., et al, "Effect of quartz filler dispersity on the service properties of epoxy coating for the internal tank surface", Source: Neftyanoe Khozyaistvo (2007), (6), 87-88, Publisher: Neftyanone Khozyaistvo, Accession No. 2007:966421 CAPLUS—English abstract only.

Naumenko, V. Yu., et al, "Nanocomposite based polymer films absorbing electromagnetic radiation", Source: Kauchuk i Rezina (2007), (2), 19-22, Publisher: Kauchuk i Rezina, Accession No. 2007:939442 CAPLUS—English abstract only.

Abdikarimov, M. N., "Epoxy resin-based fire-resistant intumescent coatings", Source: Izvestiya Natsional'noi Akademmii Nauk Respubliki Kazakhstan, Seriya Khimicheskaya (2006), (6), 46-49, Publisher: Natsional'naya Akademiya Nauk Respubliki Kazakhstan, Accession No. 2007:561165 CAPLUS—English abstract only.

Esfandeh, M., et al, "Study of silicone coating adhesion to an epoxy undercoat using silane compounds", Source: Colloids and Surfaces, A: Physiochemical and Engineering Aspects (2007), 302(1-3), 11-16, Publisher: Elsevier B.V., Accession No. 2007:519757 CAPLUS—English abstract only.

Lukinskii, O. A., "Waterproofing of underground structures", Source: Stroitel'nye Materialy (2007), (1), 22-24, Publisher: OOO RIF "Stroimaerialy", Accession No. 2007:500757 CAPLUS—English abstract only.

Sadygov, Sh. F., et al, "Coatings from modified resin ED 20", Source: Plasticheskie Massy (2006), (6), 34-36, Publisher: ZAO NP "Plasticheskie Massy", Accession No. 2006:1221814 CAPLUS—English abstract only.

Kyazimov, A. M., et al, "Effect of N-substituted cyclohexanes on protective properties of coatings", Source: Azerbaidzhanskii Khimicheskii Zhurnal (2005), (3), 74-78, Publisher: Natsional'naya Akademiya Nauk Azerbaidzhana, Accession No. 2006:1088262 CAPLUS—English abstract only.

Erofeeva, A. A., et al, "Structural polymer concretes based on modified epoxy binders", Source: Stroitel'nye Materialy (2006), (6), 96-98, Publisher: OOO RIF "Stroimaterialy", Accession No. 2006:963684 CAPLUS—English abstract only.

Sivtsov, E. V., "Modified amines as crosslinkers for epoxy resins", Source: Klei, Germetiki, Tekhnologii (2006), (5), 7-11, Publisher: OOO Nauka i Tekhnologii, Accession No. 2006:640408 CAPLUS—English abstract only.

Tikhomirova, T. S., et al, "Anticorrosive coating for gas pipelines", Source: Vestnik Natsional'nogo Tekhnicheskogo Universiteta "KhPI" (2005), (27), 99-102, Publisher: Natsional'nyi Tekhnicheskii Universitet "KhPI", Accession No. 2006:520377 CAPLUS—English abstract only.

Kotnarowska, Danuta, et al, "Application of thermomechanical studies for evaluation of aging kinetics of epoxy coatings", Source:

(56) References Cited

OTHER PUBLICATIONS

Inzynieria Powierzchni (2006), (1), 15-21, Publisher: Instytut Mechaniki Precyzyjnej. Accession No. 2006:429642 CAPLUS—English abstract only.
Kvasnikov, M. Yu, et al, "Structure and properties of fluorine-containing epoxy compositions and coatings", Source: Khimicheskaya Promyshlennost Segodnya (2006), (1), 32-35, Publisher: OOO "Khimprom Segodnya", Accession No. 2006:170446 CAPLUS—English abstract only.
Markonrenkov, Yu, A., et al, "Technology for production of acid-resistant fillers and anticorrosive compositions", Source: Izvestiya Natsional'noi Akademii Nauk Respubliki Kazakhstan, Seriya Khimicheskaya (2005), (4), 59-62, Publisher: Nauchno-Izdatel'sii Tseritr "Gylym", Accession No. 2006:21383 CAPLUS—English abstract only.
Geidarov, F. S., et al, "Compositions from a mixture of methacrylic acid-modified oligoepichlorohydrin with an epoxy oligomer", Source: Azerbaidzhanskii Khimicheskii Zhurnal (2004), (2), 68-71, Publisher: Natsional'naya Akademiya Nauk Azerbaidzhana, Accession No. 2005:195708 CAPLUS—English abstract only.
Andrianov, R. A., et al, "Thermophysical properties of fire-resistant coatings for wood polymer materials", Source: Konstruktsii iz Kompozitsionnykh Materialov (2003), (4), 56-64, Publisher: FGUP VIMI, Accession No. 2004:66747 CAPLUS—English abstract only.
Ananda, Kumar, S., et al, "Thermal properties of siliconized epoxy interpenetrating coatings", Source: Progress in Organic Coatings (2002) 45(4), 323-330, Publisher: Elsevier Science B.V., Accession No. 2002:808921 CAPLUS—English abstract only.
Dovnar, D. N., et al, "Effect of fillers on physical and mechanical characteristics of anticorrosive coatings", Source: Vestsi Natsyyanal'nai Akademii Navuk Belarusi, Seryya Fizika-Tekhnichnykh Navuk (2002), (2), 20-22, Publisher Belaruskaya Navuka, Accession No. 2002:620412 CAPLUS—English abstract only.
Tolmachev, I. A., et al, "Emulsion-type epoxy-latex paints for anticorrosion coatings", Source: Lakokrasochnye Materialy i lkh Primenenie (2002), (4), 17-19, Publisher: OOO "LKM i lkh Primenenie", Accession No. 2002:453413 CAPLUS—English abstract only.
Whittle, B. R., et al, "The effect of a silane coupling agent on the hydrolytic durability of thin epoxy resin films", Source: Journal of Adhesion (2001), 77(1), 1-24, Publisher: Gordon & Breach Science Publishers, Accession No. 2002:48968 CAPLUS—English abstract only.
Amirova, L. M., et al, "Corrosion-resistant primer based on phosphorus-containing epoxy resins", Source: Lakokrasochnye Materialy i lkh Primenenie (2001), (9), 8-10, Publisher: OOO "LKM i lkh Primenenie", Accession No. 2001:874667 CAPLUS—English abstract only.
Moshinsky, L., et al, "Hyper-branched polyamidoamines-epoxy adhesives and primers", Source: Proceedings of the Annual Meeting of the Adhesion Society (2001), 24th, 482-484, Publisher: Adhesion Society, Accession No. 2001:31664 CAPLUS—English abstract only.
Kumar, S., et al, "Assessment of corrosion-resistance of siliconised epoxy coatings by potentiodynamic polarisation method", Source: Surface Coatings International, Part B: Coatings Transactions (2001), 84(B1), 43-47, Publisher: SURFEX Ltd., Accession No. 2001:168691 CAPLUS—English abstact only.
Kotnarowska, D., "Effect of environmental factors on the surface roughness of an epoxy coating", Source: Inzynieria Powierzchni (1999), (3), 41-45, Publisher: Instytut Mechaniki Precyzyjnej, Accession No. 2000:18635 CAPLUS—English abstract only.
Kal'Ba, E. M., et al, "Adhesion strenght of polymer-containing protective coatings", Source: Materials Science (New York) (Translation of Fiziko-Khimichna Mekhanika Materialy) (1999) 35(1), 125-128, Publisher: Consultants Bureau, Accession No. 2000:3184 CAPLUS—English abstract only.
Ibragimova, M. D., et al, "Low-viscosity epoxy esters as modifiers of epoxy resins", Source: Azerbaidzhanskii Khirnicheskii Zhurnal (1997), (1-4), 21-25, Publisher: Elm, Accession No. 1999:100517 CAPLUS—English abstract only.

Starchak, V. G., et al, "Increasing the protective properties of modified epoxide coatings with inhibiting additives", Source: Zhurnal Prikladnoi Khimii (Sankt-Peterburg) (1998), 71(6), 1049-1051, Publisher: Nauka, Accession No. 199:87481 CAPLUS—English abstract only.
Onosova, L. A., et al, "Anticorrosive epoxy coatings formed under high humidity", Source: Lakokrasochnye Materialy i lkh Primenenie (1997), (6), 14-15, Publisher: TOO "Zhurnal LKM", Accession No. 1998:794160 CAPLUS—English abstract only.
Skorokhodova, O. N., et al, "Epoxy coatings cured with adducts DAP-11 and DAP-12", Source: Lakokrasochnye Materialy i lkh Primenenie (1998) (6), 3-4, Publisher: TOO "Zhurnal LKM", Accession No. 1998:583198 CAPLUS—English abstract only.
Wegmann, Alex, "Chemical resistance of waterborne epoxy/arnine coatings", Source: Progress in Organic Coatings (1997), 32(1-4), 231-239, Publisher: Elsevier Science S.A., Accession No. 1998:16800 CAPLUS—English abstract only.
Raivich, A. I., et al, "Effect of the composition of protective coatings on their technological properties", Source: Izvestiya Ministerstva Nauki-Akademii Nauk Respubliki Kazakhstan, Seriya Khimicheskaya (1996), (1), 74-81, Publisher: Gylym, Accession No. 1997:454537 CAPLUS—English abstract only.
Wegmann, Alex, "Chemical resistance of waterborn epoxy/amine coatings", Source: Proceedings of the International Waterborne, High-Solids, and Powder Coatings Symposium (1997), 24th 92-105, Publisher: University of Southern Mississippi, Dep. of Polymer Science, Accession No. 1997:267528 CAPLUS—English abstract only.
Dubowik, David A., "New curing agents for high-solids epoxy coatings", Source: Pitture e Vernici Europe (1996), 72 (19), 23-24, 26-29, Publisher: G.B.P. Communications, Accession No. 1997:221623 CAPLUS—English abstract only.
Golovin, V. A., "Acid sorption by anticorrosive polymer coatings", Lakokrasochnye Materialy i lkh Primenenie (1996), (5-6), 14-17, 48, Pubisher: TOO "Zhurnal LKM", Accession No. 1996:618104 CAPLUS—English abstract only.
Golovin, V. A., et al, "Investigation of the diffusion of acids into the anticorrosion polymer coatings", Source: Lakokrasochnye Materialy i lkh Primenenie (1996) (2-3), 15-16, 18, Publisher: TOO "Zhurnal LKM", Accession No. 1996:511586 CAPLUS—English abstract only.
Wegmann, "Novel waterborne epoxy resin emulsion", Source: Journal of Coatings Technology (1993), 65(827), 27-34, Accession No. 1994:682343 CAPLUS—English abstract only.
Smejkal, Z., "Antiradon coating system Aradon", Source: Int. Conf. Prod. Appl. Spec. Inorg. Pigm. (1993), 127-40. Editor(s): Kalenda, Petr., Publisher: Univ. Chem. Technol., Dep. Polym. Pardubice, Czech Rep., Accession No. 1994:511503 CAPLUS—English abstract only.
Wegmann, Alex, "Water-thinnable, self-emylsifying epoxy resin/polyamidoamine systems", Source: Farbe + Lack (1993), 99(8), 689-96, Accession No. 1994:301170 CAPLUS—English abstract only.
Spychaj, Tadeusz, et al, "Water-thinned epoxy coating compositions", Source: Polimery (Warsaw, Poland) (1993), 38(4-5), 200-4, Accession No. 1994:166836 CAPLUS—English abstract only.
Brady, Robert F., et al, "Influence of imidazoline content and water on the reaction between amidoamine and epoxy resins", Source: Journal of Coatings Technology (1993) 65(816), 81-8, Accession No. 1993:474622 CAPLUS—English abstract only.
Bliznets, M. M., et al, "Wear resistance of epoxy coatings modified by mineral crosslinking-agent fillers in oil-abrasive media", Source: Izvestiya Vysshikh Uchebnykh Zavedenii, Mashinostroenie (1991), (1-3), 86-8, Accession No. 1993:149464 CAPLUS—English abstract only.
Sultanov, F. Kh., et al, "Properties of anticorrosion epoxy resin compositions", Source: Polim. Kompoz-90, Mater. Vses. Nauchno-Prakt. Konf. Mezhdunar, Uchastiem (1990), vol. 2, 86-8. Editor(s): Kestel'man, V.V., Publisher: Leningr. Dom Nauchno-Tekh. Propag., Leningrad, USSR, Accession No. 1993:23775 CAPLUS—English abstract only.
Nikolaev, A. N., et al, "Epoxy resin ED-20 curing in the presence of polyurethane oligomers containing furan rings", Source:

(56) References Cited

OTHER PUBLICATIONS

Lakokrasochnye Materialy i lkh Primenenie (1991), (2), 8-9, Accession No. 1992:614565 CAPLUS—English abstract only.

Veselovskii, R. A., et al, "Physicomechanical properties of boundary layers of epoxy polymers on solid surfaces of different energy", Source: Kompozitsionnye Polimernye Materialy (1979-1995?) (1990), 46, 69-75, Accession No. 1992:512563 CAPLUS—English abstract only.

Kal'Ba, E. N., et al, "Polymer comositional wear- and corrosion-resistant coatings for protection of parts of farming machinery", Source: Lakokrasochnye Materialy i lkh Primenenie (1991), (1). 43-4, Accession No. 1992:257414 CAPLUS—English abstract only.

Stukhlyak, P. D., et al, "Tribotechnical characteristics of epoxy composite-plasma amorphous coating pairs", Source: Trenie i Iznos (1990), 11(3), 556-9, Accession No. 1992:257398 CAPLUS—English abstract only.

Sakharov, V. I., et al, "Effect of composition on the structure of epoxy resin-coal tar waterproofing coating compositions", Source: Energeticheskoe Stroitel'slvo (1990), (10), 76-7, Accession No. 1992:216386 CAPLUS—English abstract only.

Bliznets, M. M., et al, "Effect of structuring fillers on the tribotechnical characteristics of epoxy resin coatings", Source: Trenie i Iznos (1990) 11(5), 882-8, Accession No. 1992:216387 CAPLUS—English abstract only.

Sheinina, L. S., et al, "Role of adsorptional layers of surfactants in formation of polyepoxides", Source: Vysokomolekulyarnye Soedineniya, Seriya A (1991), 33(5), 1055-61. Accession No. 1991:633672 CAPLUS—English abstract only.

Petrova, I. A., et al, "Effect of curing agent on hydrophobic properties of epoxy coatings", Source: Lakokrasochnye Materialy i lkh Primenenie (1989), (6), 35-7, Accession No. 1991:64316 CAPLUS—English abstract only.

Shode, L. G., et al, "Modified polyethylenepolyamines as curing agents for epoxy oligomers", Source: Lakokrasochnye Materialy i lkh Primenenie (1990), (1), 4-7, Accession No. 1990:534181 CAPLUS—English abstract only.

Soos, Laszlo, "Effect of epoxy resins and curing on the important properties of solvent-free coating materials", Source: FATIPEC Congress (1988), vol. I(19th), 121-35, Accession No. 1990:218824 CAPLUS—English abstract only.

Simon Soerensen, Helle, et al, "Determination of the equivalence point in ambient cured two-component epoxy systems by DSC", Source: FATIPEC Congress (1986), 18th(vol. 4), 257-70, Accession No. 1988:475308 CAPLUS—English abstract only.

Akhmetova, R. K., et al, "Study of microstructure formation in epoxy protective-decorative materials", Source: Izvestiya Vuzov, Stroitel'stvo i Arkhitektura (1988), (1), 64-7, Accession No. 1988:408061 CAPLUS—English abstract only.

Shturman, A. A., et al, "Improvement of the properties of polymeric coatings", Source: Vestnik Mashinostroeniya (1987) (3), 39-41, Accession No. 1987:408919 CAPLUS—English abstract only.

Kotova, T. T. et al, "Chemical stability of EP-0055 modified putty", Source: Khimicheskoe i Neftyanoe Mashinostroenie (1995), (1), 31, Accession No. 1986:111438 CAPLUS—English abstract only.

Alekseev, G. V., et al, "Effect of infrared radiation on the curing and properties of an epoxy composition", Source: Tekhnologiya i Organizalsiya Proizvodstva (1984), (4), 47-9, Accession No. 1985:25503 CAPLUS—English abstract only.

Bliznets, M. M., "Effect of furfural-acetone monomer on wear resistance of epoxy coatings", Source: Deposited Doc. (1983), Viniti 4219-83, 11 pp., Avail: Viniti, Accession No. 1984:631989 CAPLUS—English abstract only.

Ignatyuk, V. P., et al, "Effect of the adhesion of polymaric compositions on the kinetics of coating formation", Source: Kompozitsionnye Polimernye Materialy (1979-1996?) (1984), 22, 44-7, Accession No. 1984:631958 CAPLUS—English abstract only.

Brytus, Vincent, "New development in high solid epoxy/polyamidoamine coatings", Source: Polymeric Materials Science and Engineering (1984) 50, 357-61, Acession No. 1984:512484 CAPLUS—English abstract only.

Ubaidullaev, A. K., et al, "Some factors affecting the preparation of rigid foam film concentrators of solar energy", Source: Geliotekhnika (1984), (2), 37-40, Accession No. 1984:426149 CAPLUS—English abstract only.

Emel'Yanov, Yu, V., et al, "Modification of an epoxy-phenolic polymer by an isobutylene oligomer", Source: Plasticheskie massy (1983), (5), 32-3. Accession No. 1983:424071 CAPLUS—English abstract only.

Kravtsova, V. E., et al, "Curing of the anticorrosion compositioin EFFF", Source: Plasticheskie Massy (1983), (1), 53, Accession No. 1983:73876 CAPLUS—English abstract only.

Ivanov, B.A., "Preparation of polymer-mineral molds of increased strength", Source: Promyshlennost Stroitel'nykh Materialov, Seriya 5: Keramicheskaya Promyshlennost (1981), (7), 23-4, Accession No. 1982:23733 CAPLUS—English abstract only.

Krivoi, E.A., "Application of protective polymer coatings in energy-efficient construction", Source: Energenticheskoe Stroitel'stvo (1977), (4), 30-3, Accession No. 1979:170209 CAPLUS—English abstract only.

Plum, Hans, "Antifouling effects of organotin compounds in epoxy resin-based coatings", Source: DEFAZET—Deutsche Farben-Zeitschrift (1976), 30(6-7), 264, Accession No. 1976:561945 CAPLUS—English abstract only.

Chapurin, V. I., "Diffusion of water and water-alcohol solutions into epoxy coatings used in the food [wine] industry", Source: Lakokrasochnye Materialy i lkh Primenenie (1975), (2), 50-2, Accession No. 1975:481328 CAPLUS—English abstract only.

Rudenko, B. M., et al, Epoxy-pitch coatings for the protection of shaft metal constructions:, Source: Vestnik Khar'kovskogo Politekhnicheskogo Instituta (1974), 92, 74-7, Accession No. 1975:429293 CAPLUS—English abstract only.

Pimenova, S. I., et al, "Effect of filler on the hardening depth and rate of an epoxy resin", Source: Korroziya i Zashchila v Neftegazovoi Promyshlennosti (1974), (12), 20-1, Accession No. 1975-412278 CAPLUS—English abstract only.

Pisarzhevskaya, N. P., et al, "Chemical stability of compositions produced from an epoxy resin and organosilicon varnish", Source: Voprosy Khimii i Khimicheskoi Tekhnologii (1974), 35, 109-12, Accession No. 1975:172663 CAPLUS—English abstract only.

Rudenko, B. M., et al, "Thiokol-modified epoxy-furan copolymers", Source: Lakokrasochnye Materialy i lkh Primenenie (1974), (6), 23-5, Accession No. 1975:100146 CAPLUS—English abstract only.

Jarusek, J., et al, "Epoxy resins for finishing of brewery tanks", Source: Koroze a Ochrana Materialu (1974), 18(20), 20-1, Accession No. 1975:74546 CAPLUS—English abstract only.

Dubovitskaya, I. M., "Effect of sealing compound on the aging of electoluminescent capacitors", Source: Tartu Riikllko Ulikooli Toimelised (1973), 315, 124-30, Accession No. 1975:59995 CAPLUS—English abstract only.

Chojnicka, Barbara, "Determination of polyaminoamide hardeners applied in epoxide resins", Source: Roczniki Pantswowego Zakladu Higieny (1967), 18(2), 195-8, Accesssion No. 1968:50472 CAPLUS—English abstract only.

Mukhamedgaliev, B.A., et al "Mechanism of fracture of anticorrosive composite coatings", Source: Lakokrasochnye Materialy i lkh Primenenie (1999), (9), 26-27, Accession No. 2000:35559 CAPLUS—English abstract only.

* cited by examiner

LOW BAKE AUTODEPOSITION COATINGS

FIELD OF THE INVENTION

This invention relates to autodeposition coatings on metallic surfaces of a substrate that are curable at oven temperatures of less than 130° C., autodeposition coating compositions and components thereof useful in making autodeposition coating baths that deposit such coatings, and methods of making and using autodeposition coating compositions and coating baths, as well as articles of manufacture made therefrom. More particularly, the invention relates to autodeposition coatings that cure at temperatures lower than conventional autodeposition coatings which provide chemical and corrosion performance comparable to higher temperature cure autodeposition coatings, as well as being directed to autodeposition coating compositions possessing improved storage stability and coating thermal stability, and articles of manufacture having cured and uncured autodeposited coatings deposited thereon.

BACKGROUND OF THE INVENTION

Autodeposition has been in commercial use on steel for more than thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. The disclosures of all these patents are hereby incorporated by reference. Epoxy resin-based autodeposition coating systems are described in U.S. Pat. Nos. 4,180,603; 4,289,826; 5,500,460; 7,388,044 and International Publication Number WO 00/71337, the teachings of each of which are incorporated by reference.

Autodeposition compositions are usually in the form of a liquid, usually aqueous solutions, emulsions or dispersions in which active metal surfaces of inserted articles are coated with an adherent resin or polymer film that increases in thickness the longer the metal remains in the bath, even though the liquid is stable for a long time against spontaneous precipitation or flocculation of any resin or polymer, in the absence of contact with the active metal. When used in the autodeposition process, the composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characteristics, the dispersions from which they are produced and the mechanism by which they deposit are distinctly different. Electrodeposition requires that metal or other articles to be coated be connected to a source of direct current electricity for coating to occur. No such external electric current is used in autodeposition.

Conventional autodeposition coatings are typically cured in two steps and require reaching a peak metal temperature (PMT) of about 200° C. This higher temperature cure coating provides improved properties such as resistance to temperatures up to about 220° C., but comes at a cost in time and energy for curing and limits the type of paints that can be applied to the uncured autodeposition coating.

The general difficulties facing any low temperature cure autodeposition coating composition (curable at oven temperatures of 130° C. or less) have been poor performance of the cured coating with respect to corrosion resistance, chemical resistance and high temperature resistance compared to conventional higher temperature curing autodeposition coating compositions, as well as poor storage and heat stability of the coating compositions prior to application. This is reflected in the limited, if any, commercial successes of low temperature cure chemistry in the autodeposition industry.

U.S. Pat. Nos. 4,575,523 and 6,048,443 disclose low bake cathodic ecoat compositions, but the chemistry of these compositions is unstable in autodeposition bath conditions. U.S. Pat. No. 7,388,044 discloses single component autodeposition compositions, but the coatings are generally baked above 160° C. International patent publication WO/2002/042008 discloses rinse compositions of metal phosphates that are said to improve anticorrosive properties of autodeposition coatings, but these rinses cannot catalyze crosslinking or improve chemical resistance in the autodeposition coatings described therein. International patent publication WO/2012/174424 discloses an additive having one to two nitrogen-oxygen bonds that are said to improve autodeposition coating performance on multimetal substrates, but these additives cannot catalyze crosslinking or improve chemical resistance in the autodeposition coatings described therein, and the coatings are generally baked above 160° C.

Thus, there remains a need for lower temperature curing autodeposition coating compositions and coatings that provide corrosion resistance, chemical resistance and high temperature resistance comparable to conventional higher temperature curing autodeposition coating, as well as good storage and heat stability of the coating compositions prior to application. Applicants' invention is directed to addressing one or more of the above-described challenges.

SUMMARY OF THE INVENTION

An object of the invention is to provide autodeposition coating chemistries, e.g. coating compositions and baths, that produce coatings on metal substrates which have cure temperature of 130° C. or below and continue to provide sufficient chemical resistance and improved corrosion resistance. Desirably the curing includes crosslinking of the uncured coating.

In one aspect of the invention, the autodeposition coating composition comprises blocked isocyanates that may be de-blocked at lower temperatures (less than 130° C.).

In another aspect of the invention, the aforementioned blocked isocyanates are used with an amine catalyst rinse to improve crosslinking and enhance the corrosion performance, to achieve much lower baking temperatures than the current state of art technologies.

In another aspect of the invention, the autodeposition coating bath and the process of making the autodeposition coatings of the invention comprise in-bath additives that may prolong the storage stability and/or increase heat stability of the blocked isocyanates and/or improve corrosion performance of the cured autodeposition coatings formed according to the inventive low cure process.

An autodeposition coating composition is provided that can be applied to a metal surface generating an uncured coating thereon and then the coating can be cured at or below 130° C. with or without a separate catalyst rinse to achieve improved chemical and corrosion performance, while possessing sufficient in-can storage stability and coating thermal stability.

Unlike PVDC products, the inventive coatings can sustain high operating temperatures without deterioration. While most PVDC products begin to deteriorate at about 120° C., the inventive coatings have been tested to temperatures as high as about 220° C. with no visible breakdown or delamination.

This invention provides autodeposition coating compositions useful in applications where low temperature cure processing, cured coating heat resistance and corrosion resistance, as well as autodeposition coating compatibility with lower temperature cure topcoats are required. This invention maintains autodeposition inherent advantages including environmental sustainability and simplicity. The inventive coatings and compositions are useful in application areas including pre-assembled components, rubber to metal application, vehicles, and a broad range of other industry applications where high heat curing (e.g. peak metal temperature (PMT) of greater than 130° C.) is undesirable.

As used herein, the listed abbreviations have the following meaning: DMP: 3,5-Dimethylpyrazole; DICY: Dicyandiamide; DMI: 1,2-Dimethylimidazole; DEM: Diethyl malonate; DBU: 1,8-Diazabicyclo[5.4.0]undec-7-ene; DBN: Diazacyclononane; MEKO: Methylethyl ketoxime; HDI: Hexamethylene diisocyanate; IPDI: Isophorone diisocyanate; MDI: Methylene diphenyl diisocyanate; SFS: Sodium formaldehyde sulfoxylate; tBHP: tert-Butylhydroperoxide 70%; CRS: Cold rolled steel; GPC: Gel permeation chromatography.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of min., and ratio values are by weight or mass; the term "polymer" includes "oligomer", "copolymer", "terpolymer", and the like; the first definition or description of the meaning of a word, phrase, acronym, abbreviation or the like applies to all subsequent uses of the same word, phrase, acronym, abbreviation or the like and applies, mutatis mutandis, to normal grammatical variations thereof; the term "mole" and its variations may be applied to ions, moieties, elements, and any other actual or hypothetical entity defined by the number and type of atoms present in it, as well as to materials with well-defined neutral molecules; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules; the term "latex" is to be understood to mean a dispersion in water of polymer particles, and the terms "storage stable" or "shelf stable" are to be understood as including dispersions that show no visually detectable tendency toward phase separation or show less than 75, 50, 40, 35, 30, 25, 20, 18, 16, 14, 12, 10, 9, 8, 7, 6, 5, 4, 3, 2 or 1% cross-linking, calculated by GPC comparison to unaged dispersions, over a period of observation of at least 72, 96, 120, 150, 200, 250, 300, 320, or preferably at least 336, hours during which the material is mechanically undisturbed and the temperature of the material is maintained at ambient room temperatures (18 to 25° C.).

For a variety of reasons, it is preferred that coating compositions according to the invention may be substantially free from many ingredients used in compositions for similar purposes in the prior art. Specifically, it is increasingly preferred in the order given, independently for each preferably minimized ingredient listed below, that compositions according to the invention, contain no more than 1.0, 0.5, 0.35, 0.10, 0.08, 0.04, 0.02, 0.01, 0.001, or 0.0002 percent, more preferably said numerical values in grams per liter, of each of the following constituents: chromium; vinyl chloride monomer, vinylidene chloride monomer.

The following detailed description does not limit the invention. Instead, the scope of the invention is defined by the appended claims and equivalents thereof.

DETAILED DESCRIPTION OF PREFERRED EMBODIMENTS

The invention relates to autodeposition compositions, useful in forming autodeposited coatings that are curable at temperatures of less than about 135° C., preferably 130° C., i.e. that cure at temperatures lower than conventional autodeposited coatings, while still providing comparable chemical and corrosion performance, as well as being directed to autodeposition coating baths, and articles of manufacture having cured and uncured autodeposited coatings deposited thereon.

It has been found that incorporation of latent crosslinking agent with a deblocking temperature of less than 135° C. that is stable at low pH into an epoxy-based autodeposition coating material is an effective way to lower the curing temperature without reducing the anti-corrosive properties of the applied coating. Using low temperature deblocking crosslinkers in autodeposition baths has been problematic due to pre-mature deblocking. Applicants discovered stabilization of the crosslinking agent in the low pH environment of compositions according to the invention provides crosslinking functionality during the curing while increasing shelf life of the autodeposition compositions.

The invention provides a means to obtain epoxy-based autodeposition coating materials with good chemical and corrosion resistance that are curable at temperatures of less than 135° C. In one embodiment, an epoxy pre-polymer is used. The epoxy pre-polymer is combined with ethylenically unsaturated monomer that desirably may comprise hydroxyfunctional monomer, to yield an epoxy-monomer blend, which may be blended with other coating components and additives. The resulting blend is then dispersed in water with surfactant and the ethylenically unsaturated monomer is polymerized (optionally in the presence of other formulation components) to yield an aqueous epoxy dispersion. Prior to being dispersed in water at least one curing agent, e.g. a crosslinking agent, is added to the blend. The curing agent must be stable in pH ranges of 1.5 to about 6, and desirably is a blocked or otherwise temporarily inactivated curing agent, preferably a blocked isocyanate. The curing agent may be added before, during or after the time the epoxy pre-polymer is combined with the ethylenically unsaturated monomer and optionally other coating components and additives provided it is added prior to the resulting blend being dispersed in water. As used herein "aqueous epoxy dispersion" means a dispersion in water of polymer particles comprising an epoxy polymer or pre-polymer and polymerized ethylenically unsaturated monomer, and may comprise other additives. "Film forming polymer molecules" found in the aqueous epoxy dispersion will be understood to mean at least the epoxy polymer or pre-polymer and polymerized ethylenically unsaturated monomer of the aqueous epoxy dispersion. The aqueous epoxy dispersion may then be used as one component of a coating bath formulation. The coating bath formulation can then be applied to an active metal substrate and cured to form a final coating.

The present invention solves the problems of the related art by providing a process to obtain low temperature curing epoxy-based autodepositing coating materials having good chemical resistance and/or anti-corrosive properties. The invention also produces aqueous epoxy dispersions that are capable of being used as a component of an autodepositing coating bath formulation that produces autodeposited coatings on active metal surfaces, wherein the coatings are crosslinkable at temperatures of less than about 135° C. The invention also provides stable aqueous epoxy dispersions containing crosslinking agents that have a relatively long shelf life. The invention further provides a coating that may be applied using a variety of techniques such as autodeposition, spray, electrostatic, roll, and brush application.

In one embodiment the invention comprises a process for making an aqueous epoxy dispersion, the process comprising the steps of: (a) dissolving and/or dispersing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an aqueous epoxy dispersion, wherein at least one water soluble initiator and/or at least one organic soluble initiator is added prior to step (c) and at least one latent curing agent such as, for example, a blocked isocyanate is incorporated into the mixture before the at least one ethylenically unsaturated monomer is polymerized. The type and concentration of epoxy pre-polymer and ethylenically unsaturated monomer used, as well as the type of initiator, can be varied to achieve specific performance properties such as corrosion resistance, flexibility, edge protection, and appearance properties such as gloss and smoothness.

In another embodiment, the invention comprises an autodepositing coating composition curable at temperatures of less than about 135° C. comprising one or more aqueous epoxy dispersions of the invention and at least one autodeposition accelerator component. In another embodiment, the invention comprises a process for making an autodepositing coating composition comprising combining an aqueous epoxy dispersion of the invention, water, and at least one autodeposition accelerator component.

Depending on the relative amounts of epoxy-prepolymer and ethylenically unsaturated monomer used, a solvent may also be used in conjunction with the ethylenically unsaturated monomer to form the crude or fine particle dispersions of the present invention. Solvent, for the purposes of the present application, includes any suitable solvent other than water. A solvent component may be used as a medium for preparing the epoxy pre-polymer. The solvent may be used when combining the epoxy resin and any catalysts capable of accelerating the desired epoxy group reaction. Subsequently, the solvent may be removed by techniques known in the art. The solvent, in many cases, does not diminish the technical benefits of the final coating composition and may be left in place when the aqueous epoxy dispersion is added as a component of the final coating composition. The preferred solvents are mixtures of (i) aromatic hydrocarbons having 6 to 10 carbon atoms and (ii) ketones having 3 to 8 carbon atoms. Particularly preferred solvents include propylene carbonate, butyl benzoate, butylene carbonate, butoxyethanol acetate and 2,2,4-trimethyl-1,3-pentanediol mono(2-methylpropanoate).

The relative amounts of epoxy-prepolymer and ethylenically unsaturated monomer can be varied widely to yield a variety of performance attributes. Typical weight ratios of epoxy-prepolymer to ethylenically unsaturated monomer are about 90:10 to about 15:85. In one embodiment the weight ratios of epoxy-prepolymer to ethylenically unsaturated monomer are about 90:10 to about 5:95. In another embodiment, weight ratios of epoxy-pre-polymer to ethylenically unsaturated monomer are about 70:30 to about 30:70. Other desired coating components, curing agents, and additives may be added to the epoxy pre-polymer-ethylenically unsaturated monomer mixture before, during, or after it is formed. The resulting mixture of epoxy pre-polymer, ethylenically unsaturated monomer, curing agent and any other desired coating components are then dispersed in water The epoxy pre-polymers useful in the present invention can be based on conventional epoxy resins. Such epoxy resins are well known substances and are described, for example, in the chapter entitled "Epoxy Resins" in Volume 6 of The Encyclopedia of Polymer Science and Engineering (Second Edition). Epoxy resins are often described by the type of central organic moiety or moieties to which the 1,2-epoxy moieties are attached. Non-exclusive examples of such central moieties are those derived from bisphenol A, bisphenol F, novolak condensates of formaldehyde with phenol and substituted phenols, the condensates containing at least two aromatic nuclei; triazine; hydantoin; and other organic molecules containing at least two hydroxyl moieties each, in each instance with as many hydrogen atoms deleted from hydroxy moieties in the parent molecule as there are epoxy moieties in the molecules of epoxy resin. Optionally, the 1,2-epoxy moieties may be separated from the central moieties as defined above by one or more, preferably only one methylene group. Oligomers of such monomers, either with themselves or with other organic molecules containing at least two hydroxyl moieties each, may also serve as the central organic moiety.

Non-exclusive examples of epoxy resins useful for the present invention include glycidyl ethers of a polyhydric phenol, such as bisphenol A (a particularly preferred species of polyhydric phenol), bisphenol F, bisphenol AD, catechol, resorcinol, and the like. Primarily for reasons of economy and commercial availability, it is generally preferred to utilize epoxy resins derived from bisphenol A in this invention. More particularly, epoxy moiety containing molecules utilized in this invention preferably conform to the general chemical formula:

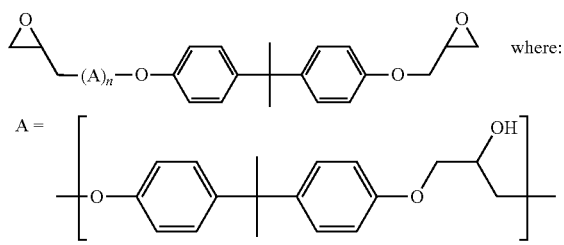

and "n" is an integer from 0 to 50. If such epoxy resins are to be used directly as the resin component of the present invention, "n" is preferably an integer within the range from about 1-30 so that each molecule contains at least one hydroxyl group. Commercially available epoxy resins of this type are normally mixtures of molecules having somewhat different "n" values and different numbers of epoxy groups. Preferably, the epoxy resin mixture used has a number average molecular weight in the range of from about 350 to about 5,000, more preferably in the range from about 400 to about 3000. Preferably, the average number of epoxide groups per molecule in the epoxy resin mixture is in the range from 1.7 to 2.5, more preferably in the range from 1.9 to 2.1. The epoxy resin mixture may contain resin molecules in which n=0.

In another embodiment, the epoxy pre-polymer comprises the reaction product of aromatic polyepoxide and at least one co-reactant having one or more epoxy-reactive groups. The ratio of epoxy and epoxy reactive groups are chosen such that epoxy endgroups remain once the reaction is essentially complete. Preferred molecular equivalent weight ranges for such pre-polymers range from 450-2000 grams/equivalent epoxy based on solids. In one embodiment the co-reactant containing epoxy reactive groups also comprises ethylenic unsaturation. Such co-reactants offer one of several means to control degrees of grafting, if any, onto the epoxy pre-polymer during the radical polymerization. Non-exclusive examples of such co-reactants include unsaturated acid esters such as acrylic and methacrylic acid, and unsaturated acids and unsaturated anhydrides such as maleic acid and maleic anhydride.

In one embodiment the pre-polymer comprises an additional monofunctional species that is capable of reacting with some of the epoxy functional groups of the pre-polymer. The resulting pre-polymer has a lower viscosity and is therefore easier to process into a dispersion with a desired particle size. Non-exclusive examples of such monofunctional species include phenol, substituted phenols such as nonylphenol, and monocarboxylic acids such as alkyl-carboxylic acids.

At least one ethylenically unsaturated monomer is used to prepare the autodeposition coating composition. Suitable ethylenically unsaturated monomers include but are not limited to vinyl aromatic hydrocarbons such as styrene and substituted styrenes, vinyl aliphatic hydrocarbons, ethylenically unsaturated acids such as acrylic and methacrylic acid as well as alkyl and hydroxy-alkyl esters of such acids. Non-exclusive examples include butyl acrylate, methyl methacrylate, and hydroxyethyl methacrylate. Acrylonitrile, methacrylonitrile, acrylamide, and methacrylamide are also suitable. Ethylenically unsaturated monomers with anionic functionality may be used. Anionic functional monomers, when co-polymerized into an emulsion or aqueous solution polymers, provide a "bound" source of ionic charges to effectively stabilize the emulsion polymer particles both during polymerization and subsequent formulation into autodeposition compositions.

Desirably hydroxyl functional ethylenically unsaturated monomer is used. The use of hydroxyl functional ethylenically unsaturated monomer provides for a dispersion that has greater solvent resistance when used in conjunction with hydroxyl reactive crosslinking or curing agents. The improvement in solvent resistance is observed in the applied coating after curing. The improvement stems from crosslinking between hydroxyl groups on the acrylic chain and crosslinking agent utilized in the aqueous epoxy dispersion. Non-exclusive examples of hydroxyl functional ethylenically unsaturated monomer include 2-hydroxyethyl methacrylate, hydroxyethyl acrylate, and hydroxy propyl methacrylate.

The aqueous epoxy dispersions and coating compositions of the present invention may also contain one or more substances capable of reacting with the polymer end product to provide a crosslinked polymeric matrix in the cured coating. In one embodiment of the invention, at least a portion of the curing agents (sometimes referred to as crosslinking agents) only react with the epoxy dispersion end-product at the elevated temperatures typically encountered during the curing stage of the composition. Such curing agents are often referred to in the art as "latent" curing agents or hardeners because they only become activated when heated to a temperature well in excess of normal room temperature. The use of latent curing agents is preferred in the present invention so that substantial cross linking of the epoxy resin or epoxy pre-polymer may be avoided prior to and during deposition on the surface of an article. In the case of metallic articles, the deposition is typically carried out at temperatures of from about 20° C. to about 60° C. However, if so desired, minor amounts of more reactive curing agents may also be present in addition to the latent curing agents so as to accomplish partial crosslinking prior to deposition on an article. In one embodiment of the invention, at least one latent curing agent such as, for example, a blocked isocyanate is incorporated into the mixture before the at least one ethylenically unsaturated monomer is polymerized.

Blocked isocyanates are popular latent curing agents. Most commercial products in the industry use blocked isocyanates with alcohols or lactams as blocking groups. These isocyanates generally deblock at fairly high temperatures in presence of catalysts, therefore, can ensure good shelf life for the paint formulations. Commercial blocked isocyanates that can deblock at relatively low temperatures are usually blocked with pyrazoles, oximes, phenols, malonates or amines et al. Many more blocking agents are available as discussed in [Douglas A. Wicks, Zeno W. Wicks Jr., Progress in Organic Coatings, 36 (1999) 148-172; 41 (2001) 1-83] but only a few of them have been commercialized. Because they deblock at lower temperatures, these blocked isocyanates are also more prone to deblock during transportation or storage, therefore, have inferior shelf or in-can stability. Some of them may also be prone to undergo other types of side reactions such as hydrolysis of oxime blocked isocyanates at low pHs and undesirable transesterification reactions of malonate based isocyanates. In autodeposition paint bath, due to extremely low pHs and presence of strong oxidizer and heavy metal ions, it's generally very difficult to incorporate a blocked isocyanate that can survive the harsh bath condition, and at the same time can function properly.

In this invention, suitable blocked isocyanates can be those blocked with pyrozoles, triazoles, oximes, phenols, malonate, amines and other amine-based blocking groups. DMP-blocked isocyanates are preferred. This include DMP blocked aliphatic isocyanates such as HDI, IPDI and derivatives, as well as aromatic isocyanates. Those mixed blocked isocyanates such as DMP blocked HDI/IPDI mixture or mixed blocked groups such as IPDI blocked with both DMP and DEM are also suitable. Desirably, typical curing temperatures for such crosslinking agents are at or below 135° C. The deblocking temperature of the latent crosslinker, i.e. the curing agent, is at least in increasing order of preference about 55, 56, 58, 60, 62, 64, 66, 68, 70, 71, 72, 74, 76, 78, 80, 82, 84, 86, 88, 90, 92, 94, 96, 98, 100, 102, 104, 106, 108, 110, 112, 114, 116, 118, 120, 122 or 124° C. and not more than in increasing order of preference about 140, 139, 138, 137, 136, 135, 134, 133, 132, 131, 130, 129, 128, 127, 126, 125 or 124° C.

Concentration of the blocked isocyanate in aqueous epoxy dispersion ranges from 0 to 20% of total monomer prior to polymerization, desirably at least about 2, 3, 4, 5, 6, 7, 8 or 10 wt. % and not more than 20, 18, 16, 14 or 12 wt. %. Typical weight ratios of blocked isocyanate to ethylenically unsaturated monomer are about 1:99 to about 20:80. In one embodiment the weight ratios of blocked isocyanate to ethylenically unsaturated monomer are about 3:97 to about 15:85. In another embodiment, weight ratios of epoxy-prepolymer to ethylenically unsaturated monomer are about 4:96 to about 10:90.

In some embodiments, a stabilizer may be included in the aqueous epoxy dispersion to stabilize the lower curing blocked isocyanates in the autodeposition compositions. Strong acids generally can slow down certain urethane reactions, therefore, can somewhat extend the shelf life of certain blocked isocyanates. The preferred acids in this invention are organic acids containing sulfur or phosphorus, for example sulfonic and phosphonic acids, as some of them are also used as corrosion inhibitors or as a component of corrosion inhibitor packages. Concentration of the strong organic acid in the mixture prior to polymerization ranges from 0-5%, measured as a percentage of total monomer present, i.e. 0-5 parts acid to 100 parts monomer. Desirably the amount of organic acid present ranges from about 0.05, 0.1, 0.3, 0.5, 1.0 or 1.5% and independently preferably is not more than, with increasing preference in the order given, 5, 4.8, 4.5, 4.2, 4, 3.8, 3.5, 3.2, 3.0, 2.8, 2.5, 2.2, 2.0, 1.9 or 1.8%.

Essentially any type of free radical generator can be used to initiate polymerization of the monomers. For example, free radical generating chemical compounds, ultraviolet light or radiation can be used. A radical initiator may be added to facilitate the polymerization of the ethylenically unsaturated monomer within the epoxy containing micelle of the dispersion. Relative degrees of grafting, if any, between epoxy pre-polymer and polymerized monomer can be achieved to provide for specific molecular weights and specific performance ends by careful selection of initiator type. Initiators may be added at various points in the process of forming the dispersion. In one embodiment, the initiator is organic soluble and is introduced in the organic phase prior to dispersion of the epoxy pre-polymer, ethylenically unsaturated monomer, and curing agent in water. In another embodiment, the initiator is water-soluble and is introduced after dispersion of the epoxy pre-polymer/ethylenically unsaturated monomer/curing agent mixture in water. In another embodiment both organic soluble initiators and water-soluble initiators are added. In another embodiment an organic soluble initiator is introduced after the aqueous dispersion is formed. In this embodiment, the organic soluble initiator is added directly or dissolved in a co-solvent and dripped into the dispersion.

Non-exclusive examples of suitable organic soluble initiators, e.g. oxidants, include peroxides, peroxy esters as well as organic soluble azo compounds. Benzoyl peroxide is one preferred example. Non-exclusive examples of suitable water-soluble initiators include hydrogen peroxide, tert-butyl peroxide, t-butyl peroxtoate, hydroperoxides such as t-butyl hydroperoxide, alkali metal (sodium, potassium or lithium) or ammonium persulfate; azo initiators such as azobisisobutyronitrile or 2,2'-azobis(2-amidinopropane)dihydrochloride; or mixtures thereof. Ammonium persulfate and Vazo 68 WSP (Available from E.I. DuPont de Nemours) are two preferred examples. In one embodiment such initiators may also be combined with reducing agents, e.g. reductant solutions, to form a redox system. Non-exclusive examples of reducing agents include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Non-exclusive examples of redox systems include: t-butyl hydroperoxide/sodium formaldehyde sulfoxylate/Fe(III); t-butyl hydroperoxide/isoascorbic acid/Fe(III); and ammonium persulfate/sodium bisulfite/sodium hydrosulfite/Fe(III). In another embodiment, sodium formaldehyde sulfoxylate is used to initiate polymerization in conjunction with at least one anionic surfactant, such as sulfates and sulfonates in the absence of peroxides. Incorporation of anionic endgroups resulting from this method provides an increased level of stability for the emulsion as well as the corresponding autodeposition bath. Nonylphenol ethoxylate sulfate ammonium salt and sodium lauryl sulfate are two suitable non-exclusive examples.

In one embodiment, the polymerization of the ethylenically unsaturated monomer is carried out with applied heat. A wide variety of temperatures can be employed and the specific optimum temperature varies with each initiator. Alternatively, redox initiation methods are widely known in the art by which polymerization can be conducted at ambient or near ambient conditions.

Coalescing agents may be incorporated into the dispersion. Coalescing agents will be apparent to those skilled in the art. Non-exclusive examples of coalescing agents include monoethers and monoesters of glycols, preferably glycols with at least one terminal hydroxy group. Monoethers of ethylene glycol are readily available. Monoethers of propylene glycol, particularly the methyl, t-butyl, n-butyl, and phenol monoethers of propylene glycol, dipropylene glycol and tripropylene glycol are preferred from this class.

A dispersion or coating bath composition of the present invention may also contain a number of additional ingredients that are added before, during, or after the formation of the dispersion. Such additional ingredients include fillers, biocides, foam control agents, pigments and soluble colorants, and flow control or leveling agents. The compositions of these various components may be selected in accordance with the concentrations of corresponding components used in conventional epoxy resin-based autodeposition compositions, such as those described in U.S. Pat. Nos. 5,500,460, and 6,096,806 and U.S. Ser. No. 09/578,935, the teachings of which are hereby incorporated by reference. Pigments and soluble colorants may generally be selected for compositions according to this invention from materials established as satisfactory for similar uses. Examples of suitable materials include carbon black, titania, phthalocyanine blue, phthalocyanine green, quinacridone red, hansa yellow, and/or benzidine yellow pigment, and the like provided that they are sufficiently stable in the autodeposition coating bath.

To prepare a coating bath composition suitable for coating a metallic substrate by autodeposition, the epoxy dispersion is combined with at least one autodeposition accelerator component, which is capable of causing the dissolution of active metals (e.g., iron) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20.degree. C. Preferably, the accelerator(s) are utilized in a concentration effective to impart to the bath composition an oxidation-reduction potential that is at least 100 millivolts more oxidizing than a standard hydrogen electrode. Such accelerators are well-known in the autodeposition coating field and include, for example, substances such as an acid, oxidizing agent, and/or complexing agent capable of causing the dissolution of active metals from active metal surfaces in contact with an autodeposition composition. The autodeposition accelerator component may be chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/L, (c) a source of hydrogen ions in an amount sufficient to impart to the autodeposition composition a pH that is at least 1.6 and not more than about 5, and, optionally, (d) hydrogen peroxide. Hydrofluoric acid is preferred as a source for both the fluoride ions as well as the proper pH. Ferric fluoride can supply both fluoride ions as well as dissolved trivalent iron. Accelerators comprised of HF and $FeF3$ are especially preferred for use in the present invention.

In one embodiment, ferric cations, hydrofluoric acid, and hydrogen peroxide are all used to constitute the autodeposition accelerator component. In a working composition according to the invention, independently for each constituent: the concentration of ferric cations preferably is at least, with increasing preference in the order given, 0.5, 0.8 or 1.0 g/l and independently preferably is not more than, with increasing preference in the order given, 2.95, 2.90, 2.85, or 2.75 g/l; the concentration of fluorine in anions preferably is at least, with increasing preference in the order given, 0.5, 0.8, 1.0, 1.2, 1.4, 1.5, 1.55, or 1.60 g/l and independently is not more than, with increasing preference in the order given, 10, 7, 5, 4, or 3 g/l; and the amount of hydrogen peroxide added to the freshly prepared working composition is at least, with increasing preference in the order given, 0.05, 0.1, 0.2, 0.3, or 0.4 g/l and independently preferably is not more than, with increasing preference in the order given, 2.1, 1.8, 1.5, 1.2, 1.0, 0.9, or 0.8 g/l.

In one embodiment the invention relates to autodeposition coating baths comprising autodeposition compositions as disclosed herein and further comprising at least one additive selected from zinc fluoride hydrate, sodium acetylacetonate hydrate and combinations thereof.

The coating can be formulated by either a single emulsion containing both the aqueous epoxy dispersion and the crosslinker or two distinct emulsions that separate the aqueous epoxy dispersion from the crosslinker until the two emulsions are combined to form the autodepositing coating bath. Being able to provide a two-pack of aqueous epoxy dispersion and crosslinker allows formulation flexibility and product customization based on customer requirements.

In one embodiment, autodeposition compositions in a single package comprising emulsions containing aqueous epoxy dispersion and crosslinker are provided as described above.

In another embodiment, autodeposition compositions can be formulated in a two-package product comprising two component emulsions, for example: Component A comprising a crosslinker for said aqueous epoxy dispersion and optional stabilizer; and Component B comprising an aqueous epoxy dispersion, solvent and any hydroxyfunctional monomer. Alternatively, Component A may comprise all components of the single package latex, in the absence of epoxy resin, solvent and hydroxy functional monomer; while Component B may comprise all components of the single package latex, in the absence of curing agent and stabilizer, with amounts of other components adjusted to be comparable to the single package latex. Ratios between two resin packages A/B: 0/100-40/60. The two components may generally be kept separate until combined with water and other components to formulate an autodepositing coating bath.

The current state-of-the-art commercial autodeposition products, such as Bonderite MPP 900 series, contain both curing agents (or crosslinkers) and the chemical groups that react with them in a single resin package. The same also holds true for the current electro-deposition resin technology and or some other major commercial metal primer packages. As it is still the industry norm that the formulations are baked at high temperatures, such as 350 F/177 C or above to become fully cured, the blocked isocyanates used in these products are mostly alcohol or lactam based products which are usually stable enough in a single package. However, when the autodeposition coating is designed to be baked at lower temperatures such as below 270 F/132° C., different curing agents that can deblock at these temperatures are usually needed and these curing agents generally also have poor in-can or shelf stability during transportation or shelf stability. Thus, it is beneficial, at least for shelf stability, to put curing agents and the chemical groups that can react with them in different packages, therefore, they don't crosslink prematurely during storage and transportation in certain regions or seasons.

In this embodiment, the blocked isocyanates are incorporated in a resin package that does not have any chemical groups that can react with them, and all the epoxy resins and hydroxyl containing components are incorporated in another package. These two resins can be blended in a designed ratio at a later stage or before charging into the autodeposition paint bath, therefore, the sufficient in-can stability can be maintained. A second advantage of the two package system can allow customers to customize the paint bath by changing the ratio of the resin packages to maximize certain properties or attributes of the autodeposition technologies. This allows a greater flexibility compared with the current state-of-the-art technologies.

An autodepositing liquid bath composition according to the present invention comprises, preferably consists essentially of, or more preferably consists of, water and:

(A) a concentration of at least 1.0%, based on the whole composition, of dispersed or both dispersed and dissolved film forming polymer molecules, i.e. epoxy resin, acrylic monomer reaction products;

(B) a surfactant component in sufficient quantity to emulsify all dispersed constituent molecules of component (A) so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal, particularly any metal that dissolves in the autodepositing composition to produce therein metal cations with a charge of at least two, or other material that reacts with the autodepositing liquid composition;

(C) a curing component comprising at least one latent cross-linking agent chemically reactive with constituents of component (A) at a temperature of 130° C. or less; and (D) a dissolved accelerator component, selected from the group consisting of acids, oxidizing agents, and complexing agents, sufficient in strength and amount to impart to the total autodepositing liquid composition an oxidation-reduction potential that is at least 100 millivolts hereinafter usually denoted "mV") more oxidizing than a standard hydrogen electrode (hereinafter usually abbreviated "SHE"); and, optionally, one or more of the following:

(E) a component of pigment, filler, or other dispersed solid phase materials other than the materials that constitute any part of any of the preceding components;

(F) a component of solvent in which constituents of component (A) that are insoluble in water were dissolved during some step in the preparation of the autodepositing liquid composition, other than materials that constitute any part of any of the preceding components;

(G) a component of organic acid stabilizer for component (C), other than materials that form any part of any of the preceding components;

(H) a component of coalescing agent, other than materials that form any part of any of the preceding components;

(I) a plasticizer component, other than materials that constitute part of any of the preceding components.

Autodeposition compositions according to the invention have a pH that is at least 1.6, or preferably is, with increasing preference in the order given, at least 1.7, 1.8, 1.9, 2.0, or 2.1 and independently preferably is, with increasing preference in the order given, not more than 5, 4.5, 3.8, 3.6, 3.4, 3.2, 3.0. 2.8, 2.6, 2.4, or 2.3;

A process for making an autodepositing aqueous dispersion, the process comprising the steps of: (a) dissolving and/or dispersing an epoxy resin or pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an aqueous dispersion, wherein at least one water soluble initiator and/or at least one organic soluble initiator, e.g. promoter, reductant solution and/or oxidant solution is added prior to or during step (c); at least one latent curing agent having a deblocking temperature of no more than 135° C., and optionally one or more of a solvent and a stabilizer, is incorporated into the mixture before the at least one ethylenically unsaturated monomer is polymerized.

A coating process according to this invention will preferably comprise the steps of: (a) contacting an article with an active metal surface with the aforedescribed autodeposition bath composition for a sufficient time to cause formation of a film of uncured coating (which film may also contain certain other components of the autodeposition bath composition, particularly the curing agent) having a predetermined thickness on the metal surface, (b) separating the coated metal surface from contact with the autodeposition bath composition, (c) rinsing the coated metal surface to remove at least some of the absorbed but otherwise unadhered components of the bath composition from the more adherent portion of the coating, and (d) heating the rinsed surface to form a final cured coating. Without wishing to be bound by theory, it is believed that when the wet adherent coating is heated, the epoxy resin and crosslinker present in the epoxy dispersion react to form a thermoset polymeric matrix. Optionally, rinsing step (c) may include rinsing with water followed by one or more of a post-treatment step and a post-catalysis step, as described herein.

Ordinarily, a metal surface is degreased and rinsed with water before applying an autodeposition composition. Conventional techniques for cleaning and degreasing the metal surface to be treated according to the invention can be used for the present invention. The rinsing with water can be performed by exposure to running water, but will ordinarily by performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred. Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns).

Optionally, a post-treatment reagent capable of causing modifications of the coated film may be included in the rinse used after cessation of contact between the wet coated surface and the bulk of the autodeposition bath composition. Such a post-treatment reagent may also be brought into contact with the wet coated film after rinsing with water alone. Contact time may be at least 1 second and preferably is not more than 5 minutes. Although the autodeposition bath compositions of the invention generally produce wet coated films that can be heated after simple rinsing with tap or deionized water to give good quality final films, the corrosion resistance of the cured coating may be further improved by rinsing with an aqueous post-treatment solution comprising soluble zirconium or titanium compounds, such as fluorometallate or carbonate compounds of these metals, e.g. ammonium zirconium carbonate; or an alkaline earth metal compound such as calcium nitrate, as described in co-owned U.S. Pat. No. 6,613,387 and which is incorporated herein by reference in its entirety. The concentration of the total of the post-treatment reagent present in the aqueous liquid rinse composition used according to the invention preferably is, with increasing preference in the order given, at least 0.001, 0.002, 0.004, 0.008, 0.016, 0.023, 0.033, 0.040, 0.047, 0.054, or 0.060 grams per liter and independently preferably is, with increasing preference in the order given, not more than 10.0, 9.0, 8.0, 7.0, 6.0, 5.0, 4.0, 2.0, 1.5, 1.3, 1.0, 0.7, 0.4, 0.20, 0.15, 0.100, 0.090, 0.080, 0.075, or 0.070 grams per liter.

In some embodiments, a post-catalysis step where an aqueous catalyst solution is applied may be used after cessation of contact between the wet coated surface and the bulk of the autodeposition bath composition and any water rinsing or post-treatment rinsing steps, and before the curing step. Although the autodeposition bath compositions of the invention generally produce wet coated films that can be heated after simple rinsing with tap or deionized water to give good quality final films, the corrosion resistance and chemical resistance of the autodeposition coatings that cure at low temperature, as described herein, may be further improved by rinsing with an aqueous catalyst solution comprising a catalyst for isocyanate reactions with active hydrogens, in particular catalysts for the blocked or inhibited isocyanates of the autodeposition coating composition in the wet coated films.

Suitable catalysts for use in the aqueous catalyst solution may include organic metallic compounds, nitrogen containing catalysts, as well as phosphorus-based compounds. The catalysts used in this invention are those that can be incorporated and stable in an aqueous formulation and can act as a catalyst for a urethane-type reaction of isocyanate with an active hydrogen. Amine based catalysts are preferred in this invention. By way of non-limiting example, suitable amine based catalysts include cyclic amidines, such as DBU, DBN and 1,2-dimethyl-1,4,5,6-tetrahydropyrimidine and the like; tertiary amines such as N-(3-dimethylaminopropyl)-N,N-diisopropanolamine; Diazabicyclo[2.2.2]octane; quinuclidine-based catalysts; and triazine-based catalysts, such as 1,3,5-tris(3-(dimethylamino)propyl)-hexahydro-s-triazine. Some primary or secondary amine containing compounds, such as imidazole, DMI and dicyandiamide and the like, can work both as catalyst and curing agents, therefore, are also suitable in this application. The concentration of the total of the catalyst present in the aqueous catalyst solution used according to the invention preferably is, with increasing preference in the order given, at least 0.1, 0.2, 0.4, 0.8, 0.016, 0.023, 0.033, 0.040, 0.047, 0.054, 0.061, or 0.068 grams per liter and independently preferably is, with increasing preference in the order given, not more than 10.0, 9.0, 8.0, 7.0, 6.0, 5.0, 4.0, 2.0, 1.5, 1.3, 1.0, 0.7, 0.4, 0.20, 0.15, 0.100, 0.090, 0.080, 0.075, or 0.072 grams per liter. Contact time with the aqueous catalyst solution may be at least 1 second and preferably is not more than 10 minutes.

Final heating of the rinsed wet coated and optionally post-treated autodeposited film is preferably at a temperature (PMT) of no more than 135° C. The curing temperature must be sufficiently high so as to effect reaction of the latent crosslinker with the epoxy- and hydroxyl-reactive functional groups of the epoxy dispersion present in the autodeposited film. As discussed above, the latent crosslinker is selected such that deblocking of the curing agent does not take place to any significant extent during transportation or storage, preferably no deblocking takes place during these times. The deblocking temperature of the latent crosslinker, i.e. the curing agent, is at least in increasing order of preference about 55, 56, 58, 60, 62, 64, 66, 68, 70, 71, 72, 74, 76, 78, 80, 82, 84, 86, 88, 90, 92, 94, 96, 98, 100, 102, 104, 106, 108, 110, 112, 114, 116, 118, 120, 122 or 124° C. and not more than in increasing order of preference about 140, 139, 138, 137, 136, 135, 134, 133, 132, 131, 130, 129, 128, 127, 126, 125 or 124° C. Generally, the final heating temperature is selected to dry and cure the coating at a temperature within the range from at least about 60° C. to about 132° C., more preferably between about 100° C. and 125° C., for a time of about 3 to about 60 minutes, more preferably for about 10 to about 30 minutes.

The heating can be performed in multiple stages, if desired, by adjusting temperature of the stages and selection of curing agent deblocking temperature. For example, in one embodiment, in a first stage lasting from about 5 to about 15 minutes, the coated substrate is heated to a peak temperature of about 55° C. to about 65° C. to flash off most of the residual water in the coating and in a second stage lasting from about 30 to about 50 minutes, the coated substrate is heated to a peak temperature of about 100° C. to about 130° C., thereby unblocking the curing agent. The peak temperature preferably is attained in preferably, no more than about 10 minutes after the first heating stage has been completed.

Metal substrates coated according to the invention having a cured autodeposition coating deposited thereon are found to have corrosion resistance comparable to conventional autodeposition coatings that require a higher cure temperature in the neutral salt spray ("NSS") test, such as ASTM B-117 and in chemical resistance tests, e.g. methylethyl ketone double rub testing (ASTM D4752).

Coatings according to the invention are also compatible with co-cure processes wherein a paint is applied to a dewatered uncured autodeposited coating and the two layers are cured together, see for example WO 2009088993. The lower curing temperature of autodeposition coatings according to the invention enables use of a wider variety of paints in a process in which the uncured autodeposition coating is dewatered, paint is applied to the uncured autodeposition coating and then the paint and the autodeposition coating are cured in the same curing step by heating to temperatures of less than about 135° C., as disclosed herein.

Autodeposition compositions employed in the present invention can be used for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

EXAMPLES

Autodepositing Epoxy-Acrylic Dispersion (Dispersion) Preparation Process

In a reactor, a monomer solution was made by dissolving epoxy and/or phenoxy resin, with other components, such as curing agent, solvent, or stabilizer, in monomer mixture as specified in the tables below, under agitation. Surfactant Solution was added under agitation to form a crude dispersion. The crude dispersion was then passed through an M-110Y Microfluidizer at 10,000 PSI, or as otherwise specified, one to three times to form a fine mini-emulsion with a particle size of below 300 nm. Then the mini-emulsion was loaded into a reactor and heated to 53° C. under nitrogen atmosphere. Promoter and Reductant Solution I were then added to the reactor. Reductant Solution II was metered into the reactor over a period of 3 hours. One hour into the Reductant Solution II addition, Oxidant Solution was metered in over a period of 3 hours. After the completion of the Oxidant Solution addition, the reactor was held for another 1 hour at 53° C., and then was cooled to room temperature, about 22° C.

Autodeposition Bath Preparation

Latex and aqueous carbon black pigment slurry with non-volatile solids of approximately 38.0% were added to a container and mixed until a homogeneous Make-up was obtained (Table I). An autodeposition paint bath was made by adding the reagents listed in the Table I sequentially under agitation in a 1 L container. The bath parameters were then adjusted to within the ranges listed in Table II before processing panels through the autodeposition paint bath.

TABLE I

| Component | Reagent | Amount in parts |
|---|---|---|
| Make-up | Example latex | 200 |
|  | Carbon black pigment slurry, aqueous | 7.7 |
| Bath | DI water | 700 |
|  | ACC Starter 300* | 25 |
|  | Make-up | 111.3 |
|  | DI water | 163.7 |
|  | ACC Activator 35* | 3.5-5 |

*ACC Starter 300 and ACC Activator 35 are conventional autodeposition paint bath components commercially available from Henkel Corporation.

TABLE II

| Parameter | Range |
|---|---|
| Redox value | 375-425 mV |
| Lineguard 101 meter reading | 110-350 microamperes |
| Total % non-volatile | 3-5% |
| Starter titration | 5-40 ml |

Coating Process

Commercially available cold rolled steel (CRS) panels (supplied by ACT Laboratories, Inc.) were coated in an autodeposition bath using one of the following processes (Table III), and then tested for chemical resistance and corrosion resistance.

TABLE III

| Steps | Process I | Process II | Process III |
|---|---|---|---|
| Cleaning | Alkaline | Alkaline | Alkaline |
| Rinse | Water | Water | Water |
| Rinse | DI water | DI water | DI water |
| Coating bath | Autodeposition | Autodeposition | Autodeposition |
| Rinse | Water | Water | Water |
| Post-treatment | E2 | See Examples | E2 |
| Post-catalysis |  |  | Catalyst Solution* |
| Bake (time/temp.) | See Examples | See Examples | See Examples |

E2 is a commercially available Zr-containing post-treatment.
*See Examples

Testing

Chemical resistance: "MEK DR" is methylethyl ketone double rub (ASTM D4752).

Corrosion resistance: "504 NSS (mm)" is neutral salt spray, 504 hours (ASTM B117).

Example 1a: Latex Preparation with DMP Blocked HDI Trimer, 70% and Phenoxy Resin A latex was made with the components listed in Table 1a. The final latex was obtained with a solid content of 35.0% and a particle size of approximately 230 nm.

TABLE 1a

| Component | Reagent | Amount wt % |
|---|---|---|
| Epoxy/Phenoxy resin | BPA epoxy resin, EEW: 860-930 g/eq | 7.66 |
|  | Phenoxy resin, 32000 MW | 5.11 |
| Curing Agent | DMP Blocked HDI Trimer, 70% | 4.88 |
| Monomer mixture | Styrene/Acrylic | 18.44 |
|  | 2-hydroxyethyl methacrylate | 0.71 |
| Solvent | Butylene carbonate | 1.55 |
| Surfactant Solution | Sodium lauryl sulfate | 1.61 |
|  | DI Water | 53.19 |
| Promoter | 1% $FeSO_4$ solution | 0.02 |
| Reductant Solution I | SFS | 0.01 |
|  | DI water | 0.43 |
| Reductant Solution II | SFS | 0.10 |
|  | DI water | 3.09 |
| Oxidant Solution | 70% tBHP solution | 0.16 |
|  | DI water | 3.04 |

Example 1b: Latex Preparation with DMP Blocked HDI Trimer, 70% and BPA Epoxy Resin A latex was made with the components listed in Table 1a, except the phenoxy resin was replaced with BPA epoxy resin, EEW: 2500-4000 g/eq. The final latex was obtained with a solid content of 35.8% and a particle size of approximately 220 nm.

Example 2a: Bath Preparation and Testing Results of Latex Example 1a

Autodeposition make-up and bath of Latex Example 1a were made according to Table I and the bath parameters were adjusted within ranges as listed in Table II. CRS panels were coated and tested, and the results are listed below.

TABLE 2a

| Coating process | Process I | Process I | Process III |
|---|---|---|---|
| Post-catalysis |  |  | 0.1% DBU solution |
| Bake (Time/Temp.) | 30 min./130° C. | 30 min./177° C. | 30 min./130° C. |
| MEK DR | 16 | >200 | >200 |
| 504 NSS (mm) | 13.5 | 8.5 | 5.1 |

Example 2b-d: Bath Preparation and Testing Results of Latex Example 1a with Different Additives in Baths Autodeposition make-ups and baths of Latex Example 1a were made according to Table I except zinc fluoride hydrate ($ZnF_2 \cdot 4H_2O$) and sodium acetylacetonate hydrate ($NaAcAc \cdot H_2O$) were added in the baths (Table 2b-d) as additives and the bath parameters were adjusted within ranges as listed in Table II. CRS panels were coated and tested, and the results are listed below.

TABLE 2b-d

| Bath | 2b | 2c | 2d |
|---|---|---|---|
| Additives (parts) | 0.268 $ZnF_2 \cdot 4H_2O$ | 0.268 $ZnF_2 \cdot 4H_2O$ 0.475 $NaAcAc \cdot H_2O$ | 0.475 $NaAcAc \cdot H_2O$ |

TABLE 2b-d-continued

| Bath | 2b | 2c | 2d |
|---|---|---|---|
| Post-catalysis | 0.1% DBU solution | 0.1% DBU solution | 0.1% DBU solution |
| Bake (Time/Temp.) | 30 min./130° C. | 30 min./130° C. | 30 min./130° C. |
| MEK DR (DR) | 150 | 140 | >200 |
| 504 NSS (mm) | 3.1 | 2.5 | 4.2 |

Example 2e: Bath Preparation and Testing Results of Latex Example 1a with Additives in the Bath and Using DBU Rinse of Different Concentrations Autodeposition make-up and bath of Latex Example 1a were made according to Table I and the bath parameters were adjusted within ranges as listed in Table II. In the bath, 0.27 grams of zinc fluoride hydrate ($ZnF_2.4H_2O$) and 0.48 grams of sodium acetylacetonate hydrate ($NaAcAc.H_2O$) were added. CRS panels were coated and tested, and the results are listed below.

TABLE 2e

| Coating process | Process II | Process III | Process III | Process III |
|---|---|---|---|---|
| Post-treatment | 0.1% DBU + 0.05% Bacote 20 | | | |
| Post-catalysis | | 0.03% DBU | 0.1% DBU | 0.3% DBU |
| Bake (Time/Temp.) | 25 min./130° C. | 25 min./130° C. | 25 min./130° C. | 25 min./130° C. |
| MEK DR (DR) | 41 | 20 | 128 | 79 |
| 504 NSS (mm) | 5.5 | 5.0 | 4.2 | 5.9 |

Example 2f: Bath Preparation and Testing Results of Latex Example 1b

Autodeposition make-up and bath of Latex Example 1b were made according to Table I and the bath parameters were adjusted within ranges as listed in Table II. CRS panels were coated and tested, and the results are listed below.

TABLE 2f

| | Coating process | | | |
|---|---|---|---|---|
| | Process III | Process III | Process III | Process III |
| Post-catalysis | 0.1% DBU | 0.1% 1,3,5-tris(3-(dimethylamino)propyl)-hexahydro-s-triazine | 0.1% DICY | 0.2% DICY |
| Bake (Time/Temp.) | 25 min./130° C. | 25 min./130° C. | 25 min./130° C. | 25 min./130° C. |
| MEK DR (DR) | 70 | 120 | 70 | >200 |
| 504 NSS (mm) | 5.5 | 6.9 | 15.2 | 15.8 |

Example 3: Bath Preparation and Testing Results of Commercially Available Epoxy Acrylic Autodeposition Coating Composition Baked at Low Temperatures Autodeposition make-up and bath of a commercial epoxy acrylic autodeposition coating product were made according to Table I and the bath parameters were adjusted within ranges as listed in Table II. CRS panels were coated and tested, and the results are listed below.

TABLE 3b

| | Coating process | | | |
|---|---|---|---|---|
| | Process I | Process I | Process III | Process III |
| Post-catalysis | | | 0.1% DBU | 0.1% 1,3,5-tris(3-(dimethylamino)propyl)-hexahydro-s-triazine |
| Bake (Time/Temp.) | 30 min./177° C. | 25 min./130° C. | 25 min./130° C. | 25 min./130° C. |
| MEK DR (DR) | >200 | 6 | 7 | 6 |
| 504 NSS (mm) | <3 | 12 | 7.5 | 6.5 |

Example 4a: Latex Preparation with BPA Epoxy and MEKO Blocked HDI Trimer

A latex was made with the components listed in Table 4a. The final latex was obtained with a solid content of 35.8% and a particle size of 230 nm. All the components and amounts are listed in Table 4a.

TABLE 4a

| Component | Reagent | Amount in wt % |
|---|---|---|
| Epoxy resin | BPA epoxy, EEW 860-930 g/eq | 7.45 |
| | BPA epoxy, EEW: 2500-4000 g/eq | 6.63 |
| Curing Agent | MEKO blocked HDI trimer | 2.37 |
| Monomer mixture | Styrene/Acrylic | 17.94 |
| | 2-hydroxyethyl methacrylate | 0.69 |
| Solvent | Butylene carbonate | 1.51 |
| Surfactant Solution | Sodium lauryl sulfate | 1.57 |
| | DI Water | 51.74 |
| Promoter | 1% FeSO4 solution | 0.02 |
| Reductant Solution I | SFS | 0.01 |
| | DI water | 0.41 |
| Reductant Solution II | SFS | 0.10 |
| | DI water | 3.00 |
| Oxidant Solution | 70% tBHP solution | 0.16 |
| | DI water | 2.95 |

Example 4b: Latex Preparation with BPA Epoxy and MEKO Blocked IPDI Trimer

A latex was made with the components listed in Table 4a except the Curing agent MEKO blocked HDI trimer was replaced with the MEKO blocked IPDI trimer. The final latex was obtained with a solid content of 36.1% and a particle size of approximately 230 nm.

Example 4c: Latex Preparation with BPA Epoxy and DMP/DEM Blocked HDI Trimer

A latex was made with the components listed in Table 4a except that BPA epoxy, EEW 860-930 g/eq was replaced with BPA epoxy, EEW: 525-550 g/eq and Curing agent MEKO blocked HDI trimer of 2.37% in total formulation was replaced with DMP/DEM blocked HDI trimer of 5.48% in total formulation. The final latex was obtained with a solid content of 34.9% and a particle size of 220 nm.

Example 4d: Latex Preparation with BPA Epoxy and DEM Blocked IPDI Trimer

A latex was made with the components listed in Example 4c except that curing agent DMP/DEM blocked HDI trimer of 5.48% in total formulation was replaced with DEM blocked IPDI trimer of 7.3% in total formulation. The final latex was obtained with a solid content of 35.3% and a particle size of approximately 240 nm.

Example 4e: Latex Preparation with BPA Epoxy, Only and MDI Uretdione

A latex was made with the components listed in Table 4e. The final latex was obtained with a solid content of 34.2% and a particle size of 240 nm. All the components and amounts are listed in Table 4e.

TABLE 4e

| Component | Reagent | Amount in wt % |
|---|---|---|
| Epoxy resin | BPA epoxy, EEW 860-930 g/eq | 17.28 |
| Curing Agent | MDI Uretdione | 2.20 |
| Monomer mixture | Styrene/Acrylic | 16.62 |
|  | 2-hydroxyethyl methacrylate | 0.65 |
| Solvent | 2,2,4-trimethyl-1,3-pentanediol mono(2-methylpropanoate) | 1.47 |
| Surfactant Solution | Ammonium lauryl sulfate | 1.56 |
|  | DI Water | 52.38 |
| Promoter | 1% $FeSO_4$ solution | 0.02 |
| Reductant Solution I | SFS | 0.01 |
|  | DI water | 0.48 |
| Reductant Solution II | SFS | 0.12 |
|  | DI water | 3.51 |
| Oxidant Solution | 70% tBHP solution | 0.18 |
|  | DI water | 3.45 |

Example 5a: Bath Preparation and Testing Results of Latex Example 4a

Autodeposition make-up and bath of Latex Example 4a were made according to Table I and the bath parameters were adjusted within ranges as listed in Table II. CRS panels were coated and tested, and the results are listed below. The bath was not stable and crashed after a few weeks.

TABLE 5a

| | Coating process | | | |
|---|---|---|---|---|
| | Process I | Process I | Process III | Process III |
| Post-catalysis | | | 0.1% DBU | 0.1% 1,3,5-tris(3-(dimethylamino)propyl)-hexahydro-s-triazine |
| Bake (Time/Temp.) | 25 min./177° C. | 25 min./130° C. | 25 min./130° C. | 25 min./130° C. |
| MEK DR (DR) | 20 | 8 | 10 | 7 |
| 504 NSS (mm) | 16.82 | 19.96 | 1.80 | 1.83 |

Example 5b: Bath Preparation and Testing Results of Latex Example 4b

Autodeposition make-up and bath of Latex Example 4b were made according to Table I and the bath parameters were adjusted within ranges as listed in Table II. CRS panels were coated, however, all coatings had mud cracking across the panels as indicated in Table 5b.

TABLE 5b

| | Coating process | | |
|---|---|---|---|
| | Process I | Process I | Process III |
| Post-catalysis | | | 0.1% DBU solution |
| Bake (Time/Temp.) | 30 min./130° C. | 30 min./177° C. | 25 min./130° C. |
| Problem | Mud cracked | Mud cracked | Mud cracked |

Example 5c: Bath Preparation and Testing Results of Latex Example 4c

Autodeposition make-up and bath of Latex Example 4c were made according to Table I and the bath parameters were adjusted within ranges as listed in Table II. CRS panels were coated and tested, and the results are listed below. The bath was not stable and crashed after a few months.

TABLE 5c

| | Coating process | | |
|---|---|---|---|
| | Process I | Process I | Process III |
| Post-catalysis | | | 0.1% DBU solution |
| Bake (Time/Temp.) | 30 min./130° C. | 30 min./177° C. | 30 min./130° C. |
| MEK DR (DR) | 80 | >200 | 140 |
| 504 NSS (mm) | ~45 | ~25 | ~50 |

Example 5d: Bath Preparation and Testing Results of Latex Example 4d

Autodeposition make-up and bath of Latex Example 4d were made according to Table I and the bath parameters were adjusted within ranges as listed in Table II. CRS panels were coated and tested, and the results are listed below.

TABLE 5d

| | Coating process | | |
|---|---|---|---|
| | Process I | Process I | Process III |
| Post-catalysis | | | 0.1% DBU solution |
| Bake (Time/Temp.) | 30 min./130° C. | 30 min./177° C. | 30 min./130° C. |
| MEK DR (DR) | 80 | >200 | 140 |
| 504 NSS (mm) | ~25 | 4.5 | 7.5 |

Example 5e: Bath Preparation and Testing Results of Latex Example 4e

Autodeposition make-up and bath of Latex Example 4a were made according to Table I and the bath parameters were adjusted within ranges as listed in Table II. CRS panels were coated and tested, and the results are listed below.

TABLE 5e

| | Coating process | | | |
|---|---|---|---|---|
| | Process II | Process II | Process III | Process III |
| Post-treatment | E2 + 0.3% DICY | 0.1% DBU + 0.05% Bacote 20 | | |
| Post-catalysis | | | 0.1% DBU | 0.2% DICY |
| Bake (Time/Temp.) | 25 min./130° C. | 25 min./130° C. | 25 min./130° C. | 25 min./130° C. |
| MEK DR (DR) | 10 | 15 | 9 | 10 |
| 504 NSS (mm) | 11.5 | 26.5 | 5.4 | 13.6 |

Example 6a: Latex Preparation with 2,2,4-trimethyl-1,3-pentanediol mono(2-methylpropanoate)

A latex was made with the same components listed in Table 4a except that Curing agent MEKO blocked HDI trimer was replaced with DMP blocked HDI trimer and Solvent Butylene carbonate was replaced with 2,2,4-trimethyl-1,3-pentanediol mono(2-methylpropanoate). The final latex was obtained with a solid content of 36.4% and a particle size of approximately 220 nm.

Example 6b: Latex Preparation with 2,2,4-trimethyl-1,3-pentanediol mono(2-methylpropanoate) and Dinonylnaphthalene Disulfonic Acid 55% in Isobutanol A latex was made with the same components for Example 6a except that Stabilizer Dinonylnaphthalene disulfonic acid 55% in isobutanol was added. The final latex was obtained with a solid content of 36.8% and a particle size of approximately 230 nm.

Example 6c: Latex Preparation with Propylene Carbonate and Dinonylnaphthalene Disulfonic Acid 55% in Isobutanol A latex was made with the same components for Example 6b except that Solvent 2,2,4-trimethyl-1,3-pentanediol mono(2-methylpropanoate) was replaced with propylene carbonate. The final latex was obtained with a solid content of 36.1% and a particle size of approximately 230 nm.

Example 6d: Latex Preparation of Propylene Carbonate and Organic Sulfonic Acid, Proprietary A latex was made with the same components for Example 6c except that Stabilizer Dinonylnaphthalene disulfonic acid 55% in isobutanol was replaced with a proprietary organic sulfonic acid. The final latex was obtained with a solid content of 35.9% and a particle size of approximately 240 nm.

Example 6e: Latex Preparation with Propylene Carbonate and Dinonylnaphthalene Monosulfonic Acid 50% in Heptane A latex was made with the same components for Example 6c except that Stabilizer Dinonylnaphthalene disulfonic acid 55% in isobutanol was replaced with Dinonylnaphthalene monosulfonic acid 50% in heptane. The final latex was obtained with a solid content of 35.8% and a particle size of approximately 230 nm.

Example 7a: Bath Preparation and Testing Results of Latex Example 6a

Autodeposition make-up and bath of Latex Example 6a were made according to Table I and the bath parameters were adjusted within ranges as listed in Table II. CRS panels were coated and tested, and the results are listed below.

TABLE 7a

| | Coating process | | | |
|---|---|---|---|---|
| | Process III | Process III | Process III | Process III |
| Post-catalysis | 0.1% DBU | 0.1% 1,3,5-tris(3-(dimethylamino)propyl)-hexahydro-s-triazine | 0.2% DICY | 0.2% DMI |
| Bake (Time/Temp.) | 25 min./130° C. | 25 min./130° C. | 25 min./130° C. | 25 min./130° C. |
| MEK DR (DR) | 13 | 87 | 28 | 18 |
| 504 NSS (mm) | 4.9 | 4.0 | 8.4 | 4.4 |

Example 7b: Bath Preparation and Testing Results of Latex Example 6b

Autodeposition make-up and bath of Latex Example 6b were made according to Table I and the bath parameters were adjusted within ranges as listed in Table II. CRS panels were coated and tested, and the results are listed below.

TABLE 7b

| | Coating process | | | |
|---|---|---|---|---|
| | Process I | Process III | Process III | Process III |
| Post-catalysis | | 0.1% DBU | 0.1% 1,3,5-tris(3-(dimethylamino)propyl)-hexahydro-s-triazine | 0.2% DMI |
| Bake (Time/Temp.) | 25 min./130° C. | 25 min./130° C. | 25 min./130° C. | 25 min./130° C. |
| MEK DR (DR) | 14 | 65 | 33 | 28 |
| 504 NSS (mm) | 12.0 | 7.7 | 6.1 | 8.6 |

Example 7c: Bath Preparation and Testing Results of Latex Example 6c

Autodeposition make-up and bath of Latex Example 6c were made according to Table I and the bath parameters were adjusted within ranges as listed in Table II. CRS panels were coated and tested, and the results are listed below.

TABLE 7c

| | Coating process | | | |
|---|---|---|---|---|
| | Process III | Process III | Process III | Process III |
| Post-catalysis | 0.1% DBU | 0.07% DBU | 0.04% DBU | 0.1% 1,3,5-tris(3-(dimethylamino)propyl)-hexahydro-s-triazine |
| Bake (Time/Temp.) | 25 min./ 130° C. | 25 min./ 130° C. | 25 min./ 130° C. | 25 min./130° C. |
| MEK DR (DR) | 34 | 54 | 30 | 86 |
| 504 NSS (mm) | 2.86 | 1.48 | 2.23 | 2.48 |

Example 7d: Bath Preparation and Testing Results of Latex Example 6d

Autodeposition make-up and bath of Latex Example 6d were made according to Table I and the bath parameters were adjusted within ranges as listed in Table II. CRS panels were coated and tested, and the results are listed below.

TABLE 7d

| | Coating process | | | |
|---|---|---|---|---|
| | Process III | Process III | Process III | Process III |
| Post-catalysis | 0.1% DBU | 0.07% DBU | 0.04% DBU | 0.1% 1,3,5-tris(3-(dimethylamino)propyl)-hexahydro-s-triazine |
| Bake (Time/Temp.) | 25 min./ 130° C. | 25 min./ 130° C. | 25 min./ 130° C. | 25 min./130° C. |
| MEK DR (DR) | 73 | 45 | 23 | 60 |
| 504 NSS (mm) | 1.77 | 0.98 | 0.92 | 1.17 |

Example 7e: Bath Preparation and Testing Results of Latex Example 6d

Autodeposition make-up and bath of Latex Example 6d were made according to Table I and the bath parameters were adjusted within ranges as listed in Table II. CRS panels were coated and tested, and the results are listed below.

TABLE 7e

| | Coating process | | | |
|---|---|---|---|---|
| | Process III | Process III | Process III | Process III |
| Post-catalysis | 0.1% DBU | 0.07% DBU | 0.04% DBU | 0.1% 1,3,5-tris(3-(dimethylamino)propyl)-hexahydro-s-triazine |
| Bake (Time/Temp.) | 25 min./ 130° C. | 25 min./ 130° C. | 25 min./ 130° C. | 25 min./130° C. |
| MEK DR (DR) | 45 | 90 | 30 | 60 |
| 504 NSS (mm) | 1.80 | 1.58 | 1.11 | 1.80 |

Example 8: Storage Stability Comparison Between Latex Examples 6a and 6b at 50° C.

The Latex Examples 6a and 6b were stored in 50° C. oven for three weeks to test storage stability. The polymers were analyzed using Gel Permeation Chromatography (GPC) before and after the storage period. The test results indicated that the Latex Example 6b had less polymer loss due to pre-mature crosslinking after the storage period at elevated temperature than Latex Example 6a.

Example 9a: Resin Preparation of Single Resin Package

A latex was made with the components listed in Table 9a. The final latex was obtained with a solid content of 35.7% and a particle size of approximately 200 nm.

TABLE 9a

| Component | Reagent | Amount in wt % |
|---|---|---|
| Epoxy resin | BPA epoxy, EEW: 860-930 g/eq | 7.65 |
| | BPA epoxy, EEW: 2500-4000 g/eq | 6.34 |
| Curing Agent | DMP blocked HDI trimer; 70% | 3.10 |
| Monomer mixture | Styrene/acrylic | 18.41 |
| | 2-hydroxyethyl methacrylate | 0.71 |
| Solvent | Butoxyethanol acetate | 1.55 |
| Stabilizer | Dinonylnaphthalene monosulfonic acid 50% in heptane | 0.71 |
| Surfactant Solution | Sodium lauryl sulfate | 1.61 |
| | DI Water | 53.11 |
| Promoter | 1% $FeSO_4$ solution | 0.02 |
| Reductant Solution I | SFS | 0.01 |
| | DI water | 0.43 |
| Reductant Solution II | SFS | 0.11 |
| | DI water | 3.08 |
| Oxidant Solution | 70% tBHP solution | 0.16 |
| | DI water | 3.03 |

Example 9b: Resin Preparation of Package A of Two Resin Package System

A latex was made with the same components as listed in Table 9a except that Epoxy resins, 2-hydroxyethylmethacrylate and Solvent were not added. The final latex was obtained with a solid content of 32.2% and a particle size of approximately 90 nm.

Example 9c: Resin Preparation of Package B of Two Resin Package System

A latex was made with the same components as listed in Table 9a except that Curing agent and Stabilizer were not added. The final latex was obtained with a solid content of 37.0% and a particle size of approximately 220 nm.

Example 10: Bath Preparation and Testing Results of Single Package Example 9a Vs Two Package 9b&9c Blend Autodeposition make-ups and baths of Latex Example 9a as well as a blend of 9b and 9c (9b/9c: 35.7/140.9) were made according to Table I and the bath parameters were adjusted within ranges as listed in Table II. CRS panels were coated and tested, and Latex Example 9a and the blend of 9b and 9c had similar performance in both MEK and NSS testing.

Example 11: Storage Stability Comparison Between Single Package Latex Example 9a and Latex Example 9b of the Two Part Package 9b & 9c at 50° C.

The Latex Examples 9b and 9a were stored in 50° C. oven for three weeks to test storage stability. The polymers were analyzed using Gel Permeation Chromatography (GPC) before and after the storage period. The test results indicated that the Latex Example 9b had less polymer loss due to pre-mature crosslinking after the storage period at elevated temperature than Latex Example 9a.

We claim:

1. An autodeposition coating process comprising steps of:
   (a) contacting an article having an active metal surface with an autodepositing liquid bath composition comprising water and:
      (A) dispersed or both dispersed and dissolved film forming polymer comprising active hydrogens present in a concentration of at least 1.0% of the composition;
      (B) a surfactant component present in sufficient quantity to emulsify component (A);
      (C) a curing component comprising at least one latent cross-linking agent chemically reactive with the active hydrogens of component (A) at temperatures of 129° C. or less and stable at pH ranges of 1.5 to about 6 comprising at least one isocyanate; and
      (D) a dissolved accelerator component;
      wherein the autodepositing liquid bath composition is capable of depositing on an active metal surface and curing upon heating by cross-linking at temperatures of 129° C. or less, for a sufficient time to form an uncured autodeposited coating on the metal surface,
   (b) removing the article from contact with the autodepositing liquid bath composition,
   (c) rinsing the uncured autodeposited coating, wherein the rinsing step (c) comprises rinsing with water followed by a post-catalysis step comprising applying an aqueous catalyst solution to the uncured autodeposited coating, wherein the aqueous catalyst solution comprises a catalyst for a urethane-type reaction of the isocyanate with the active hydrogens comprising at least one of a cyclic amidine, a tertiary amine, a quinuclidine, a triazine, an imidazole, or a combination thereof; and
   (d) heating the uncured autodeposited coating to a temperature of at least 55° C. and no more than 129° C. for a time sufficient to thereby form a cured autodeposited coating.

2. The autodeposition coating process according to claim 1, wherein the at least one latent cross-linking agent comprises an isocyanate blocked with a pyrazole, a malonate, or a combination thereof.

3. The autodeposition coating process according to claim 2, wherein the isocyanate comprises an aromatic isocyanate and/or aliphatic isocyanate.

4. The process according to claim 2, wherein the pyrazole comprises 3,5-dimethyl pyrazole (DMP) or the malonate comprises diethyl malonate (DEM).

5. The process according to claim 4, wherein the isocyanate comprises at least one of methylene diphenyl diisocyanate (MDI), hexamethylene diisocyanate (HDI), isophorone diisocyanate (IPDI), derivatives thereof, or combinations thereof.

6. The autodeposition coating process according to claim 1, wherein the autodepositing liquid bath composition of step (a) further comprises a component of solvent, other than materials that constitute any part of any of the preceding components, selected from propylene carbonate, butyl benzoate, butylene carbonate, butoxyethanol acetate, 2,2,4-trimethyl-1,3-pentanediol mono(2-methylpropanoate) or a combination thereof.

7. The autodeposition coating process according to claim 1, wherein the rinsing step (c) comprises rinsing with water followed by a post-treatment step.

8. The autodeposition coating process according to claim 7, wherein the post-treatment step comprises rinsing the uncured autodeposited coating with an aqueous post-treatment solution comprising at least one water-soluble compound of zirconium or titanium and/or sodium acetylacetonate hydrate present in a range of 0.001 g/l to about 10.0 g/l.

9. The autodeposition coating process according to claim 8, wherein the heating step (d) has a final heating temperature in a range of at least 60° C. to about 129° C., for a time of about 3 to about 60 minutes.

10. The autodeposition coating process according to claim 1, wherein concentration of a total of the catalyst present is about 0.1 g/l to about 10.0 g/l.

11. The process of claim 1, wherein the film-forming polymer is a dispersed epoxy-acrylate having a particle size of 300 nm or less.

12. An autodeposition coating process comprising steps of:
   (a) contacting an article having an active metal surface with an autodepositing liquid bath composition comprising water and:
      (A) dispersed or both dispersed and dissolved film forming polymer comprising active hydrogens present in a concentration of at least 1.0% of the composition;
      (B) a surfactant component present in sufficient quantity to emulsify component (A);
      (C) a curing component comprising at least one latent cross-linking agent chemically reactive with the active hydrogens of component (A) at temperatures of 129° C. or less and stable at pH ranges of 1.5 to about 6 comprising at least one isocyanate; and
      (D) a dissolved accelerator component;
      wherein the autodepositing liquid bath composition is capable of depositing on an active metal surface and curing upon heating by cross-linking at temperatures of 129° C. or less, for a sufficient time to form an uncured autodeposited coating on the metal surface,
   (b) removing the article from contact with the autodepositing liquid bath composition,
   (c) rinsing the uncured autodeposited coating, wherein the rinsing step (c) comprises rinsing with water followed by a post-catalysis step comprising applying an aqueous catalyst solution to the uncured autodeposited coating, wherein the aqueous catalyst solution comprises a catalyst for a urethane-type reaction of the isocyanate with the active hydrogens, wherein the catalyst comprises at least one of 1,3,5-tris(3(dimethylamino)propyl)-hexahydro-s-triazine, 1,8-diazabicyclo[5.4.0]undec-7-ene, dicyandiamide, 1,2-dimethylimidazole, or combinations thereof; and
   (d) heating the uncured autodeposited coating to a temperature of at least 55° C. and no more than 129° C. for a time sufficient to thereby form a cured autodeposited coating.

* * * * *